(12) United States Patent
Iwama

(10) Patent No.: US 7,609,457 B2
(45) Date of Patent: Oct. 27, 2009

(54) ZOOM LENS AND IMAGE PICKUP APPARATUS INCLUDING THE SAME

(75) Inventor: Rei Iwama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 12/127,638

(22) Filed: May 27, 2008

(65) Prior Publication Data

US 2009/0040622 A1 Feb. 12, 2009

(30) Foreign Application Priority Data

May 28, 2007 (JP) .............................. 2007-140256

(51) Int. Cl.
  *G02B 15/14* (2006.01)
(52) U.S. Cl. ...................... 359/687; 359/686
(58) Field of Classification Search ................ 359/683, 359/684, 685, 686, 687
See application file for complete search history.

(56) References Cited

U.S. PATENT DOCUMENTS

| 5,134,524 | A | 7/1992 | Hamano |
| 6,577,450 | B2 | 6/2003 | Hamano |
| 6,853,496 | B2 | 2/2005 | Eguchi |
| 7,193,790 | B2 | 3/2007 | Hamano |
| 7,236,307 | B2 * | 6/2007 | Noguchi et al. ............. 359/687 |
| 7,286,298 | B2 | 10/2007 | Yamashita |
| 7,319,562 | B2 * | 1/2008 | Itoh ........................... 359/687 |
| 7,561,344 | B2 * | 7/2009 | Itoh ........................... 359/687 |

* cited by examiner

*Primary Examiner*—David N Spector
(74) *Attorney, Agent, or Firm*—Canon USA Inc IP Div

(57) ABSTRACT

A zoom lens includes a first lens unit having a positive refractive power, a second lens unit having a negative refractive power, a third lens unit having a positive refractive power, and a fourth lens unit having a positive refractive power in that order from an object side to an image side. Zooming is performed by changing distances between the lens units. The first lens unit includes two or less lenses and the second lens unit consists of a negative lens and a positive lens in that order from the object side to the image side. The zoom lens satisfies the following condition:

$$-1.3 < m1/\sqrt{(fw \cdot fT)} < -0.8$$

where fw and fT are focal lengths of the entire lens unit at wide-angle and telephoto ends, respectively, and m1 is an amount of movement of the first lens unit in an optical axis direction during zooming from the wide-angle end to the telephoto end.

10 Claims, 17 Drawing Sheets

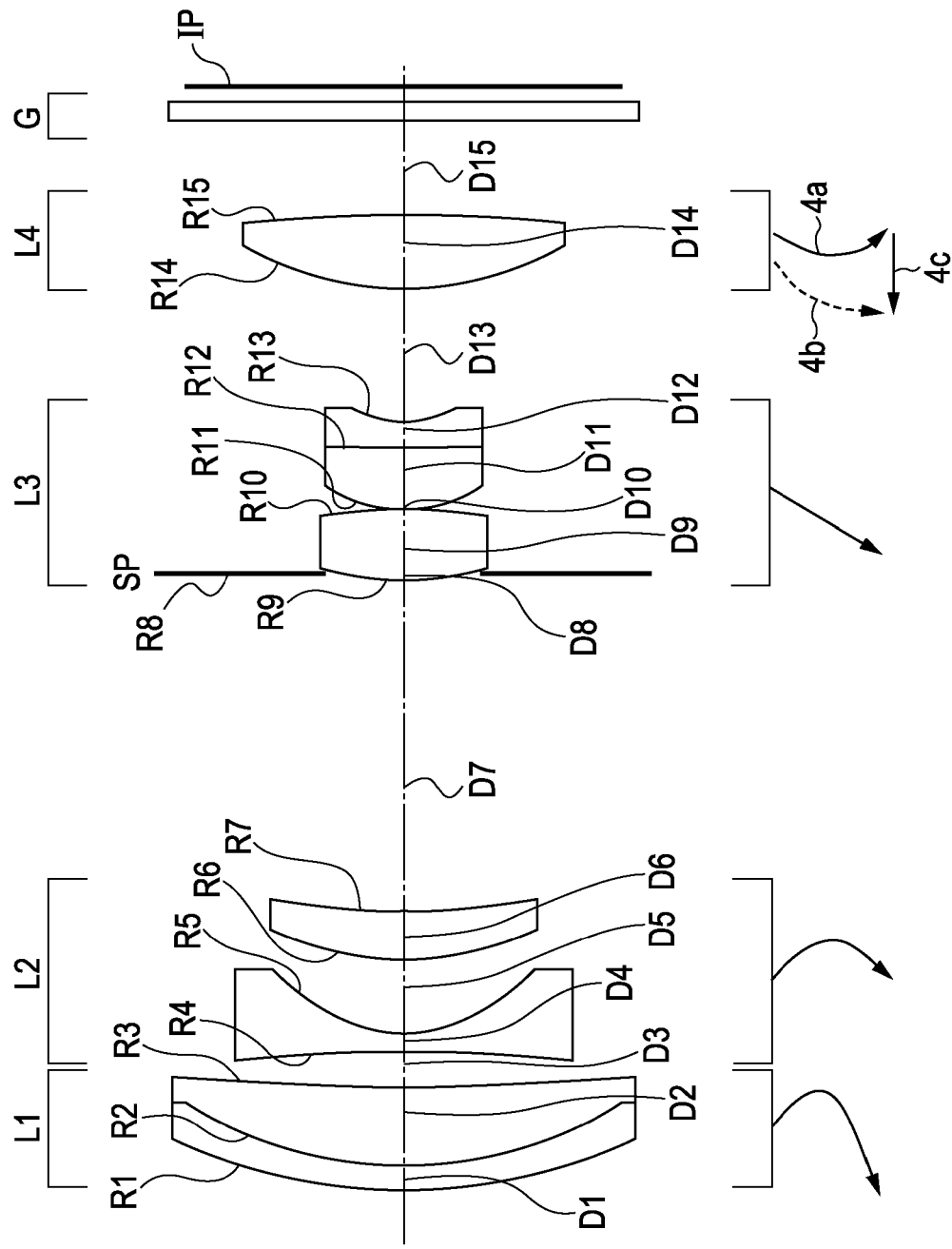

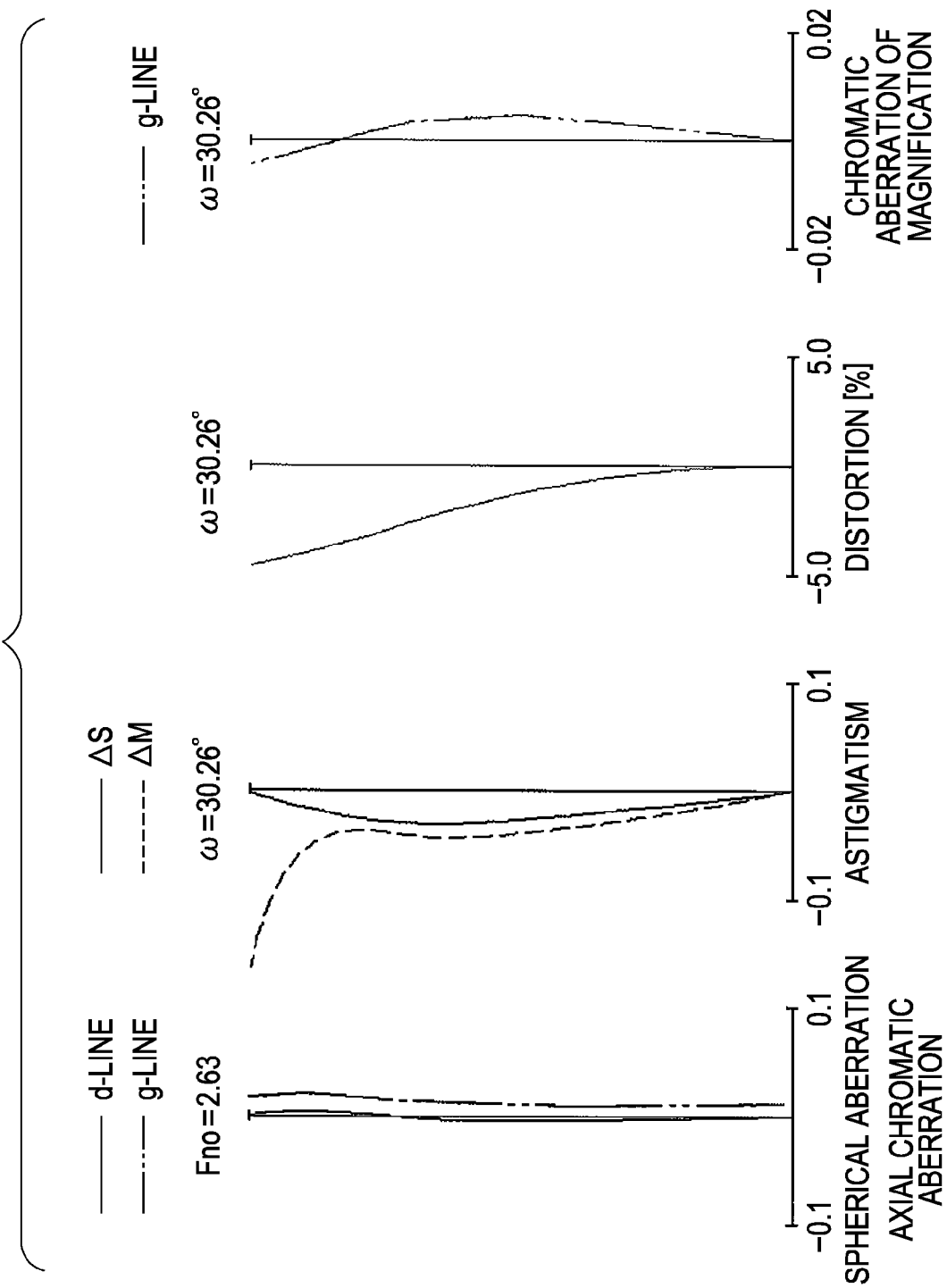

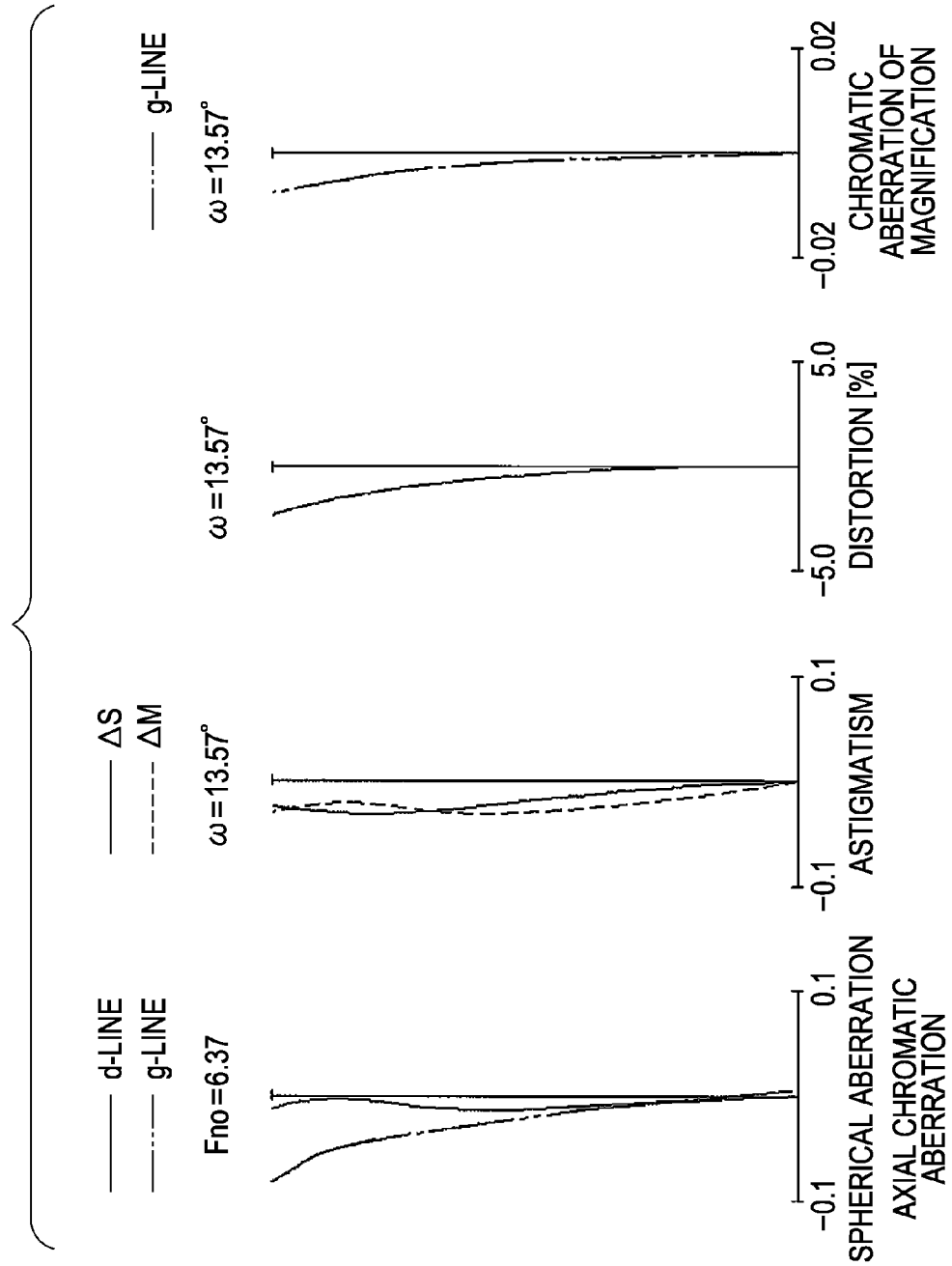

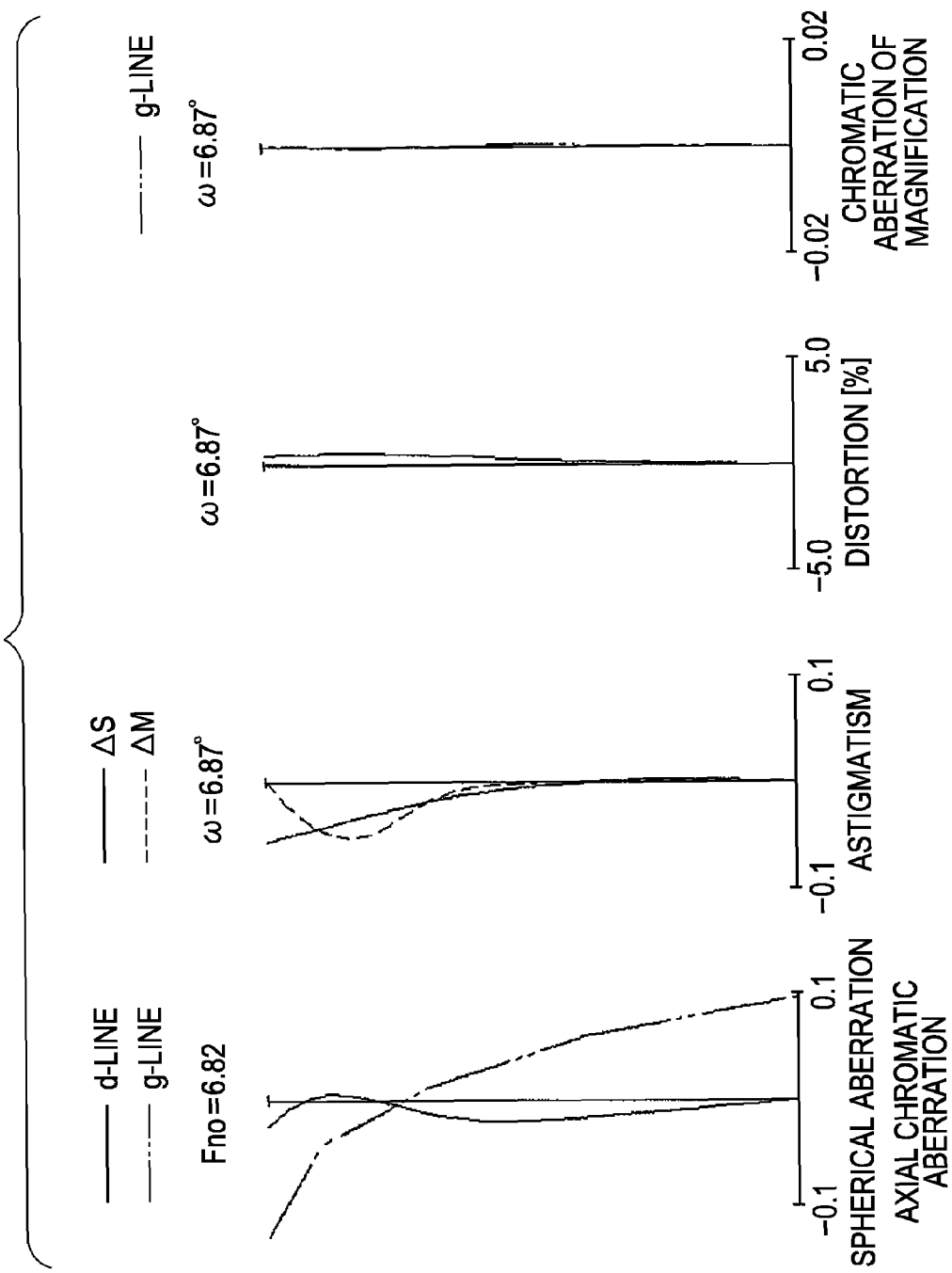

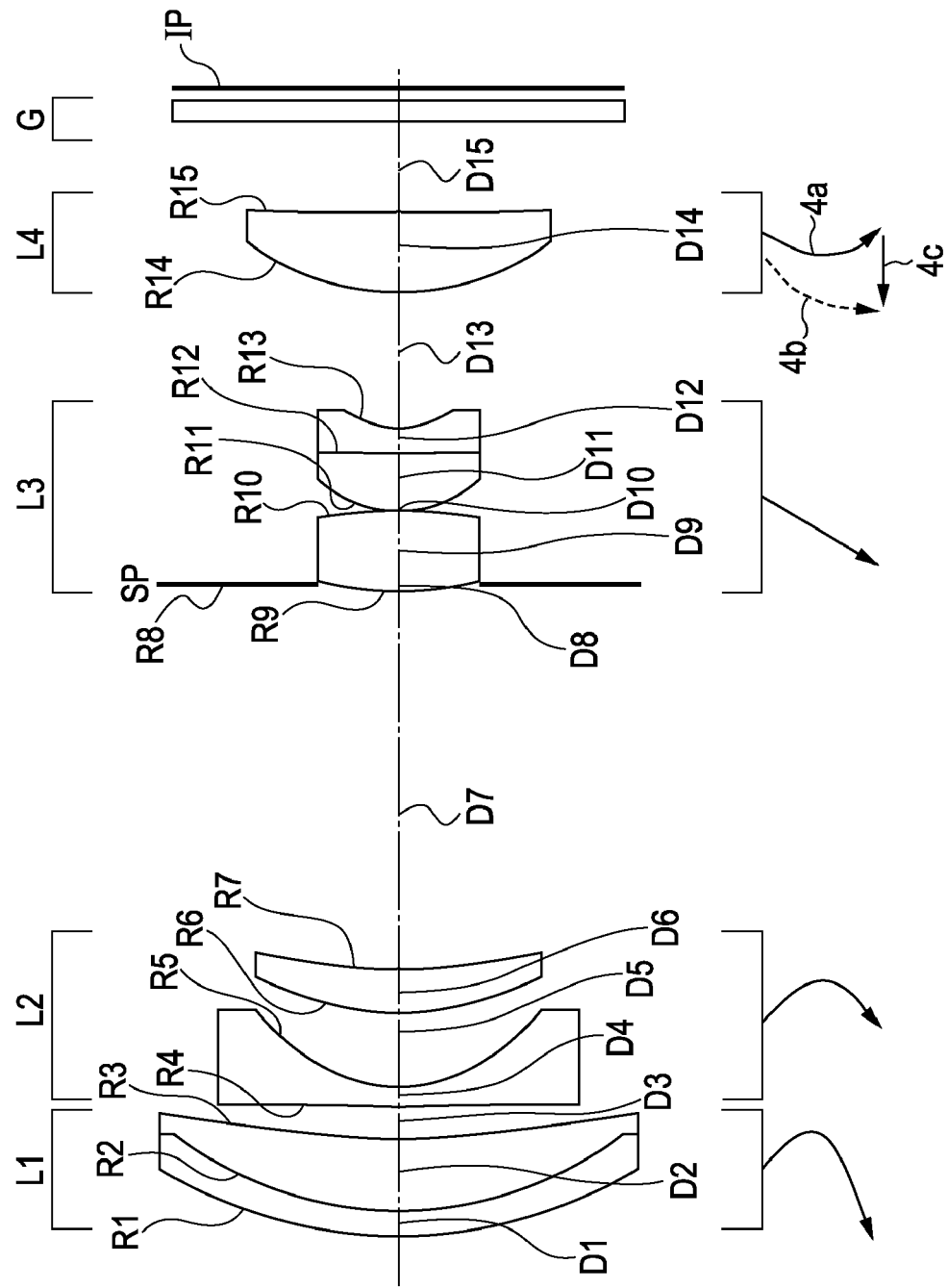

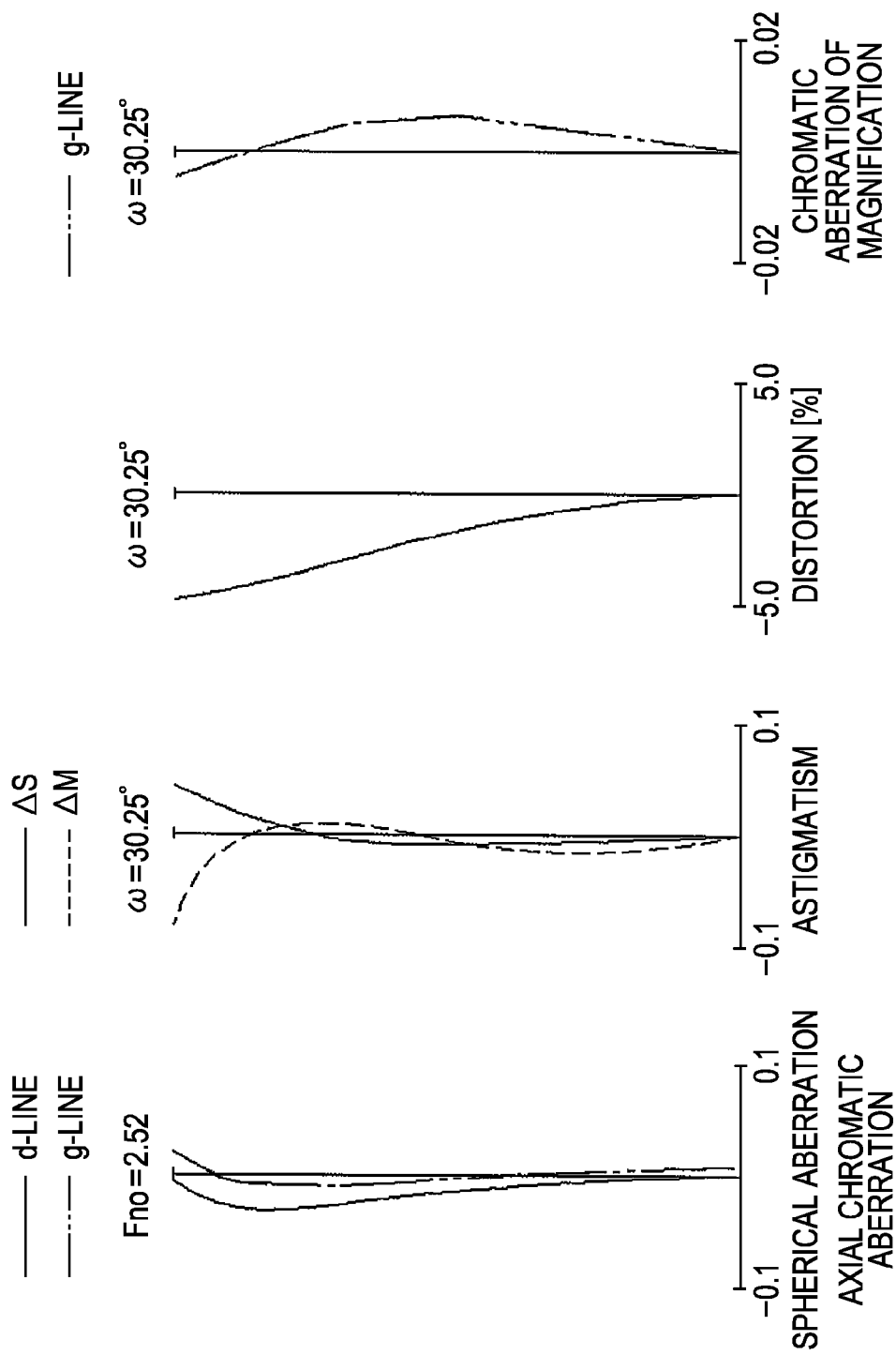

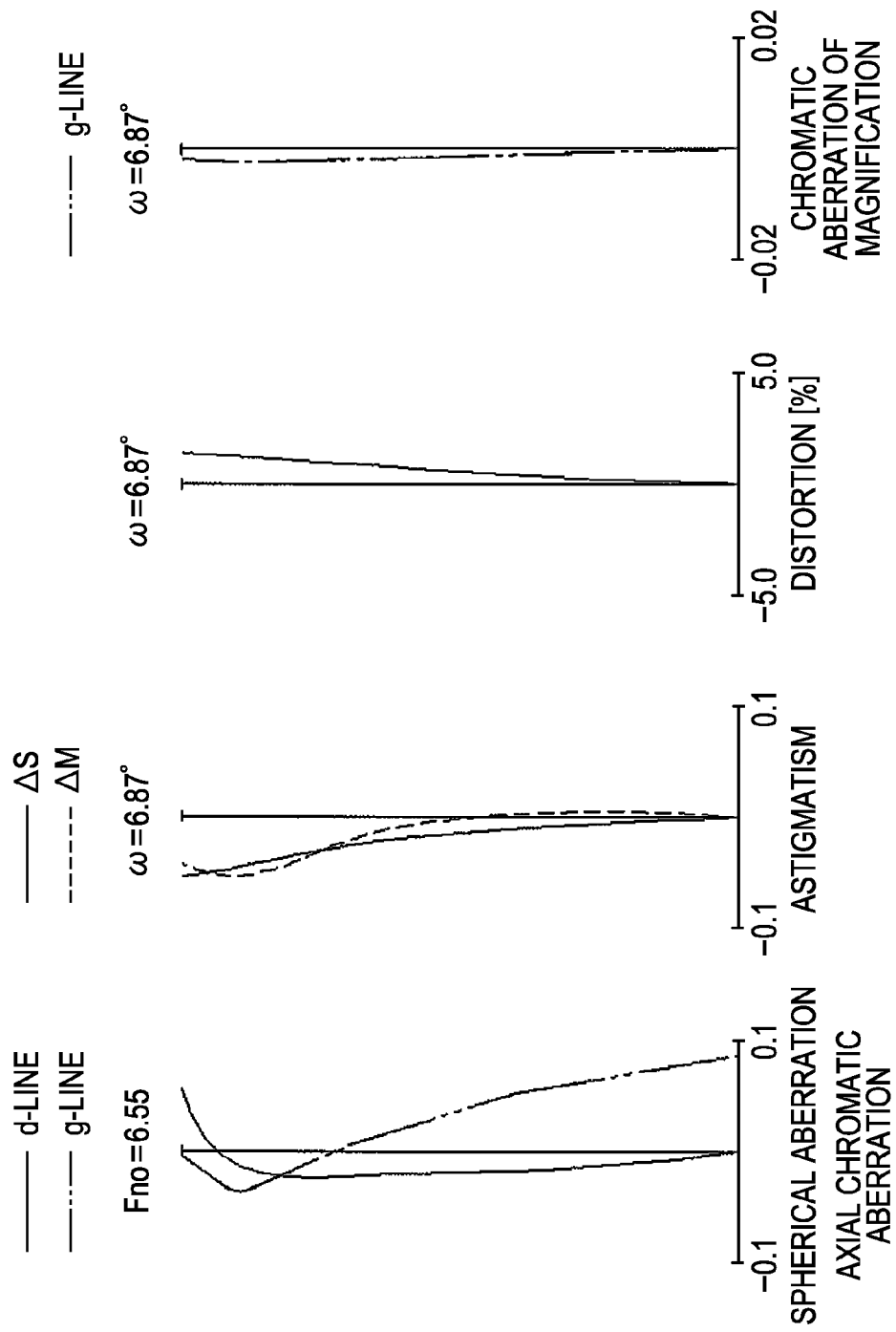

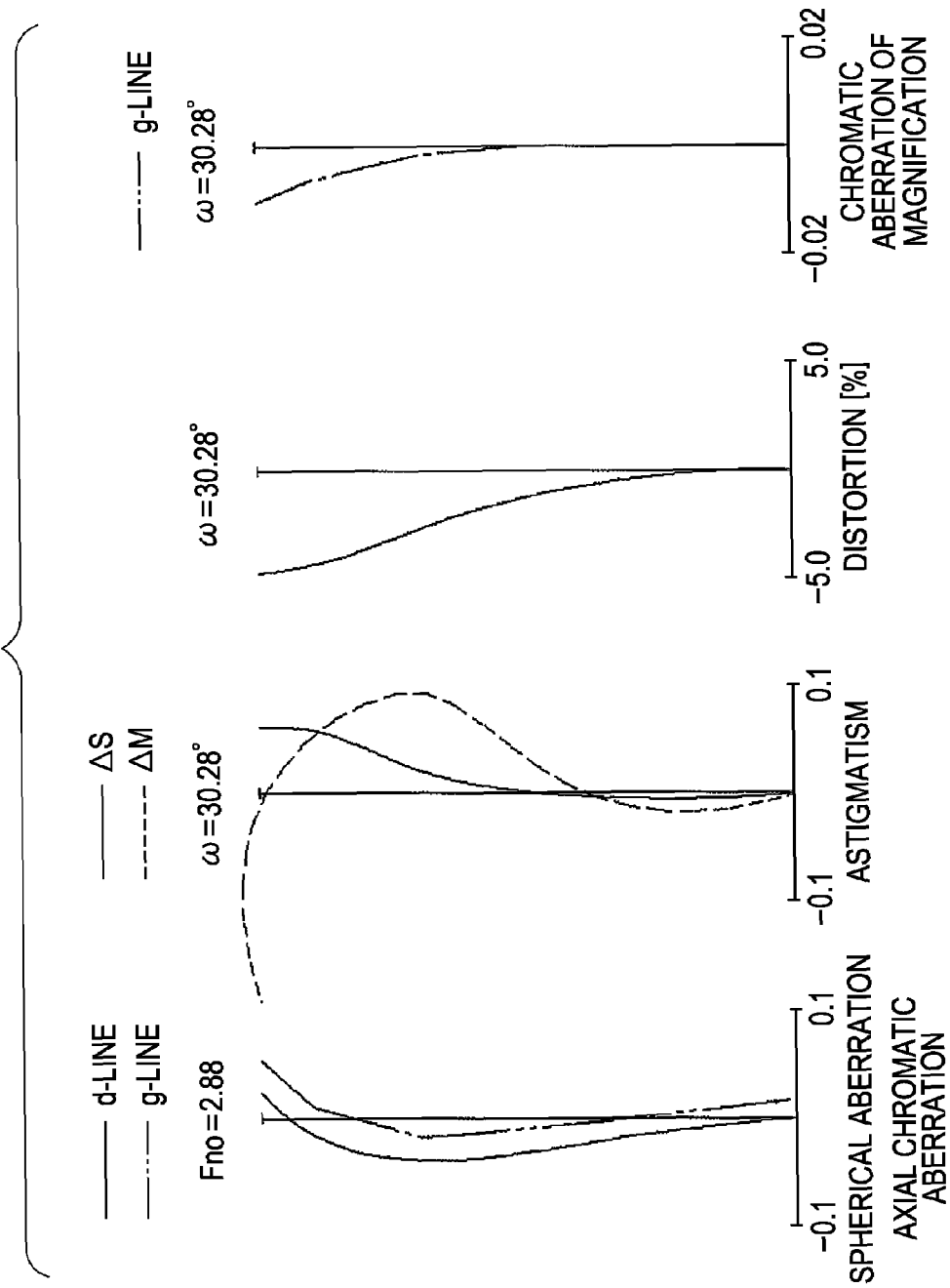

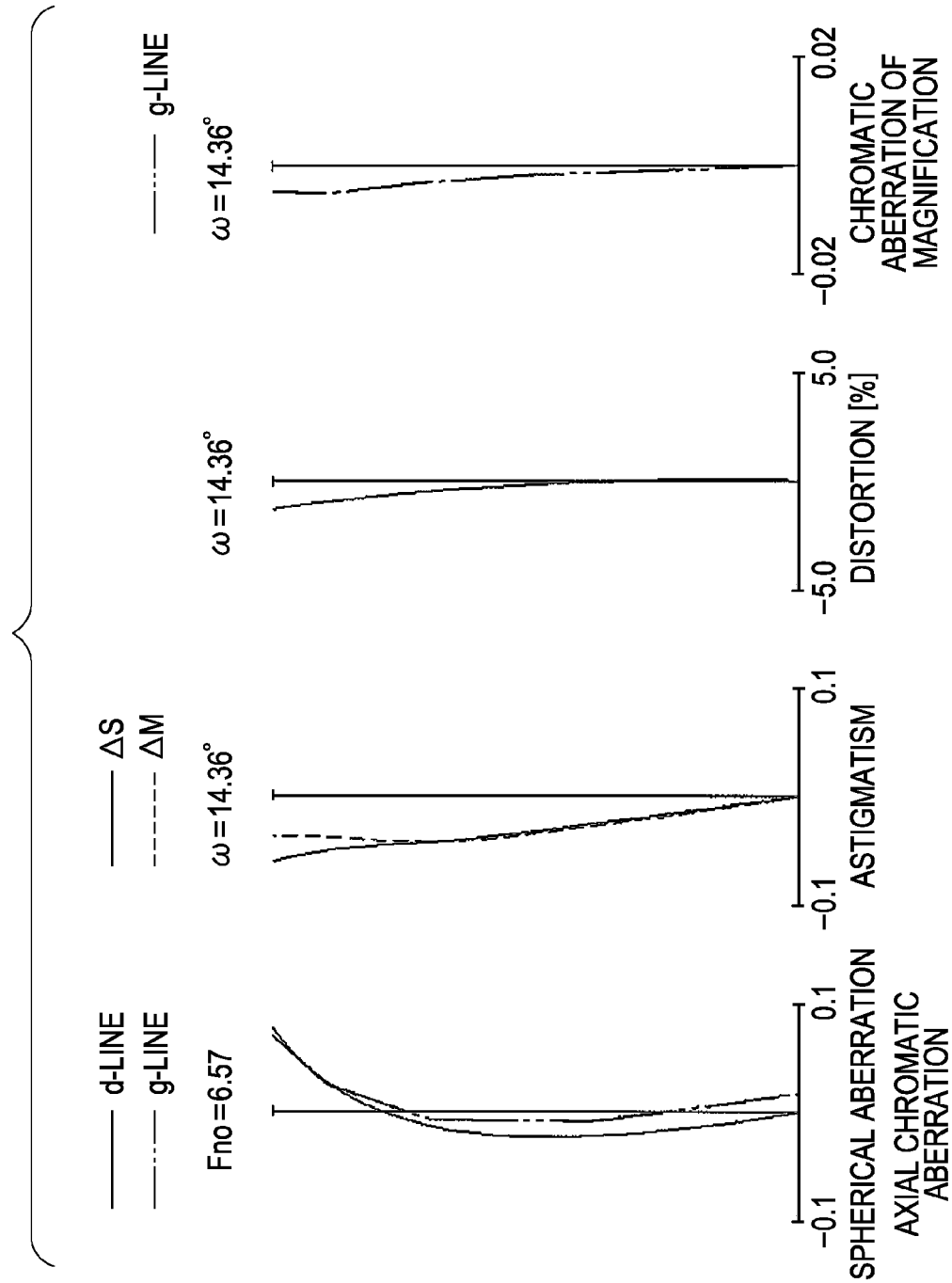

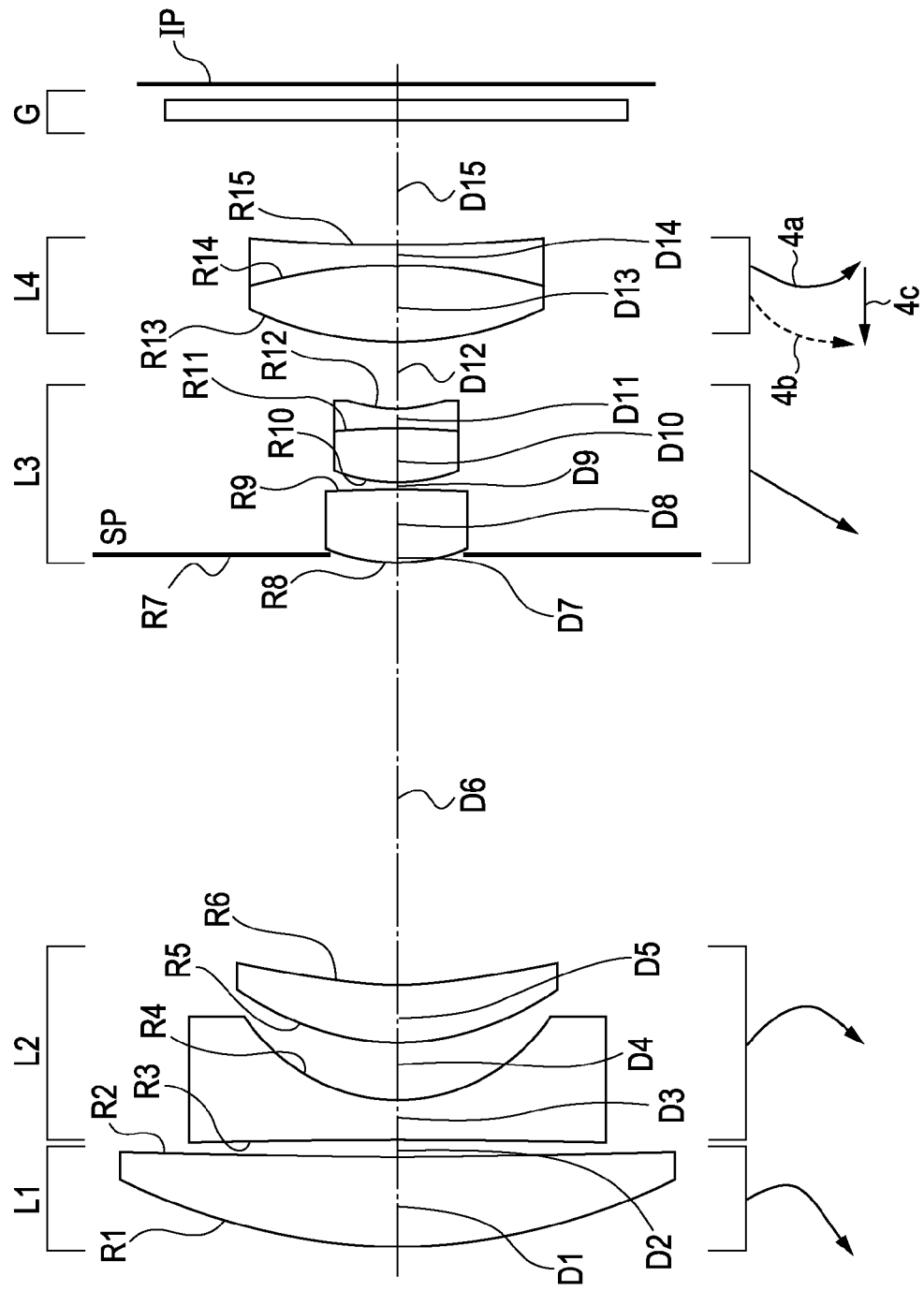

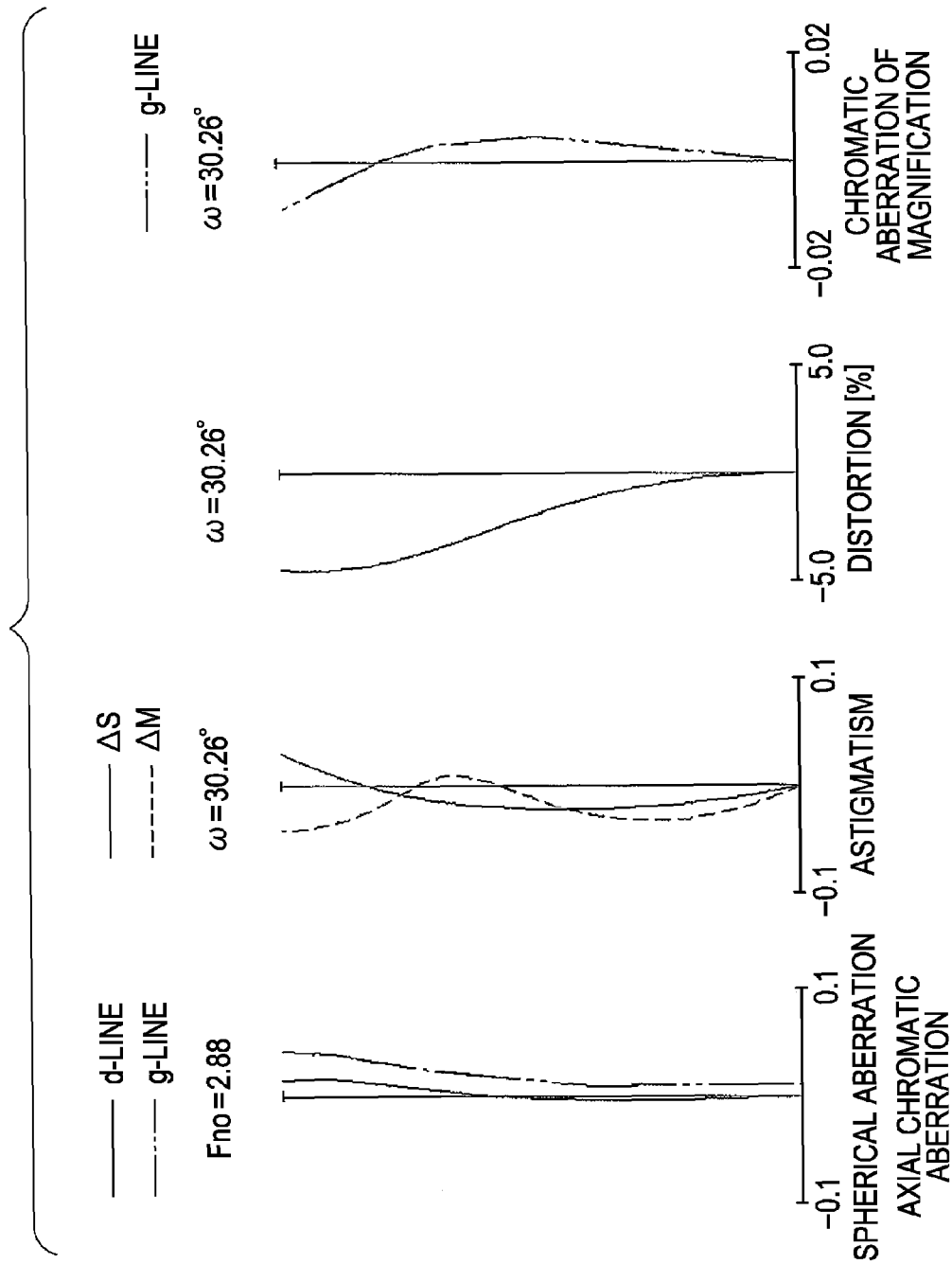

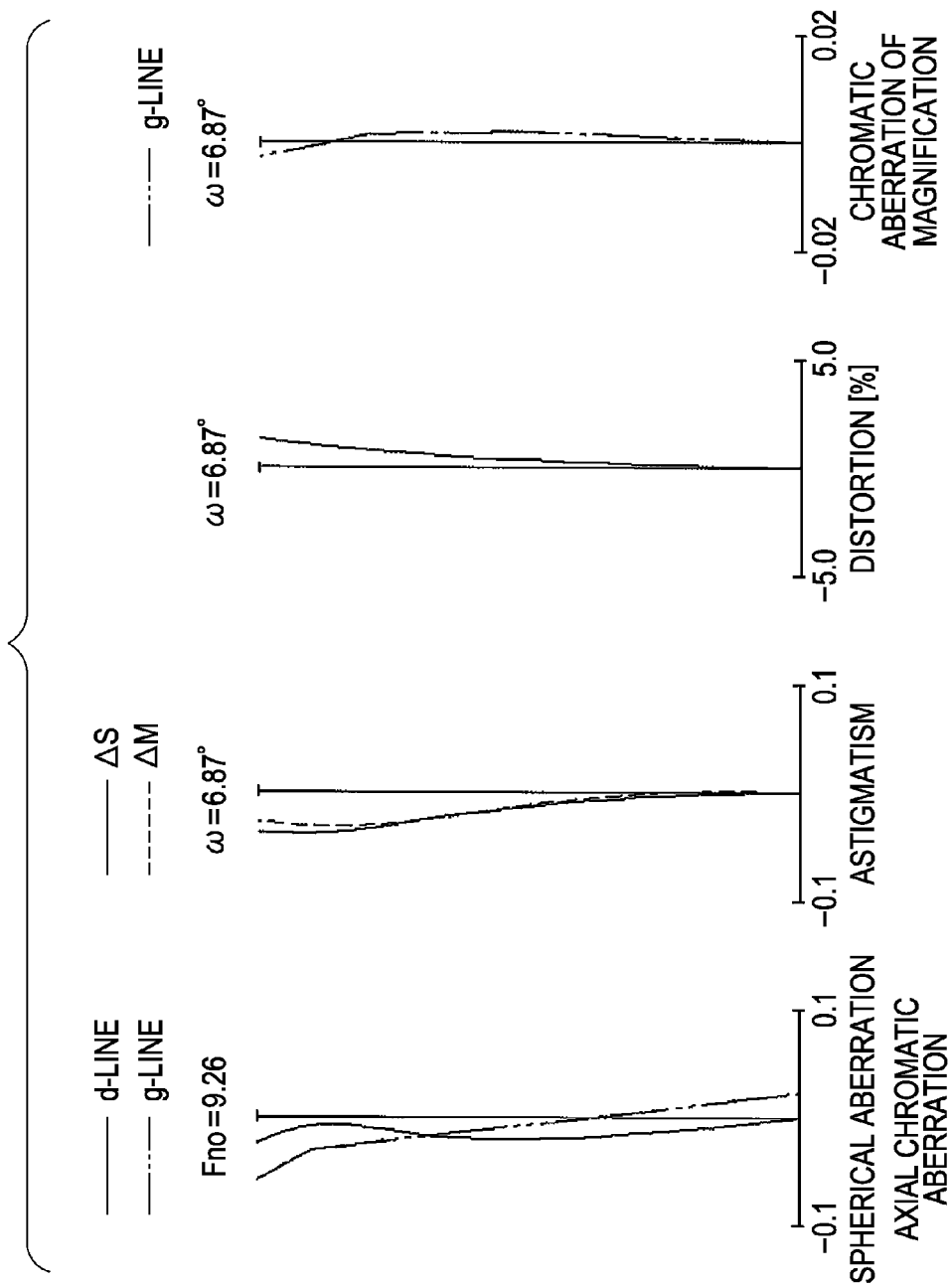

ZOOM LENS AND IMAGE PICKUP APPARATUS INCLUDING THE SAME

BACKGROUND OF THE INVENTION

1. Field of the Invention

The present invention relates to zoom lenses suitable for use in image pickup apparatuses such as still cameras, video cameras, broadcasting cameras, and digital still cameras.

2. Description of the Related Art

Recently, image pickup apparatuses (cameras), such as video cameras and digital still cameras, including solid-state image pickup devices have become smaller with increased functionality.

Accordingly, demand has increased for small, high-zoom-ratio zoom lenses having a small length and high optical performance over the entire zoom range for use in image-forming optical systems of the image pickup apparatuses.

In a retractable zoom lens having lens units that can be retracted when the camera is not used, it is necessary to reduce the number of lenses included in each lens unit and to reduce the size of each lens unit in order to reduce the overall size of the zoom lens.

In general, the size of the zoom lens can be reduced by reducing the amount of movement of each lens unit during zooming while increasing the refractive power of each lens unit, and reducing the number of lenses included in each lens unit.

However, in the case in which the refractive power of each lens unit in the zoom lens is increased, aberration variation during zooming is also increased. Therefore, it becomes difficult to obtain high optical performance over the entire zoom range and over the entire image plane.

Therefore, to obtain a high zoom ratio and high optical performance while reducing the size of the entire lens system, it is important to adequately set the refractive power of each lens unit and conditions under which each lens unit is moved during zooming.

As an example of a small zoom lens having a zoom ratio of 4.5 or more, a zoom lens which includes four lens units and which performs zooming by moving the lens units is described in U.S. Pat. Nos. 6,853,496, 7,286,298, and 7,193,790. The zoom lens includes a lens unit having a positive refractive power, a lens unit having a negative refractive power, a lens unit having a positive refractive power, and a lens unit having a positive refractive power arranged in that order from an object side to an image side.

In the zoom lens including four lens units, the second lens unit can be composed of a negative lens and a positive lens to reduce the size of the entire system, as described in U.S. Pat. Nos. 5,134,524 and 6,577,450.

In this type of zoom lens including four lens units, the high zoom ratio and high optical performance cannot be obtained unless the lens structure of the first lens unit, the amount of movement of the first lens unit during zooming, and the lens structure of the second lens unit, which provides a magnification-varying function, are adequately set.

SUMMARY OF THE INVENTION

The present invention is directed to a small, high-zoom-ratio zoom lens capable of providing high optical performance over the entire zoom range and an image pickup apparatus including the zoom lens.

According to an embodiment of the present invention, a zoom lens includes a first lens unit having a positive refractive power; a second lens unit having a negative refractive power; a third lens unit having a positive refractive power; and a fourth lens unit having a positive refractive power. The first lens unit, the second lens unit, the third lens unit, and the fourth lens unit are arranged in that order from an object side to an image side. The zoom lens performs zooming by changing distances between the lens units. The first lens unit includes two or less lenses and the second lens unit consists of a negative lens and a positive lens in that order from the object side to the image side. The zoom lens satisfies the following condition:

$$-1.3 < m1/\sqrt{(fw \cdot fT)} < -0.8$$

where fw and fT are focal lengths of the entire lens system at a wide-angle end and a telephoto end, respectively, and m1 is an amount of movement of the first lens unit in an optical axis direction during zooming from the wide-angle end to the telephoto end, the amount of movement m1 being positive when the first lens unit moves toward the image side and negative when the first lens unit moves toward the object side.

Further features of the present invention will become apparent from the following description of exemplary embodiments with reference to the attached drawings.

BRIEF DESCRIPTION OF THE DRAWINGS

FIG. 1 illustrates a sectional view of a zoom lens according to a first embodiment at a wide-angle end.

FIG. 2A illustrates aberration diagrams of the zoom lens according to the first embodiment at a wide-angle end.

FIG. 2B illustrates aberration diagrams of the zoom lens according to the first embodiment at a middle zoom position.

FIG. 2C illustrates aberration diagrams of the zoom lens according to the first embodiment at a telephoto end.

FIG. 3 illustrates a sectional view of a zoom lens according to a second embodiment at a wide-angle end.

FIG. 4A illustrates aberration diagrams of the zoom lens according to the second embodiment at a wide-angle end.

FIG. 4C illustrates aberration diagrams of the zoom lens according to the second embodiment at a telephoto end.

FIG. 6A illustrates aberration diagrams of the zoom lens according to the third embodiment at a wide-angle end.

FIG. 6B illustrates aberration diagrams of the zoom lens according to the third embodiment at a middle zoom position.

FIG. 7 illustrates a sectional view of a zoom lens according to a fourth embodiment at a wide-angle end.

FIG. 8A illustrates aberration diagrams of the zoom lens according to the fourth embodiment at a wide-angle end.

FIG. 8C illustrates aberration diagrams of the zoom lens according to the fourth embodiment at a telephoto end.

DESCRIPTION OF THE EMBODIMENTS

Zoom lenses according to embodiments of the present invention and an image pickup apparatus including any one of the zoom lenses according to the embodiments will now be described.

Each of the zoom lenses according to the embodiments includes a first lens unit having a positive refractive power, a second lens unit having a negative refractive power, a third lens unit having a positive refractive power, and a fourth lens unit having a positive refractive power in that order from the object side to the image side. The zoom lenses perform zooming by changing the distances between the lens units.

FIG. 1 illustrates a sectional view of a zoom lens according to a first embodiment of the present invention at a wide-angle end (short-focal-length end).

FIGS. 2A, 2B, and 2C are aberration diagrams of the zoom lens according to the first embodiment at a wide-angle end, a middle zoom position, and a telephoto end (long-focal-length end), respectively.

The zoom lens according to the first embodiment has a zoom ratio of 4.85 and an F number of 2.63 to 4.96.

FIG. 3 illustrates a sectional view of a zoom lens according to a second embodiment of the present invention at a wide-angle end.

Figure 4B:
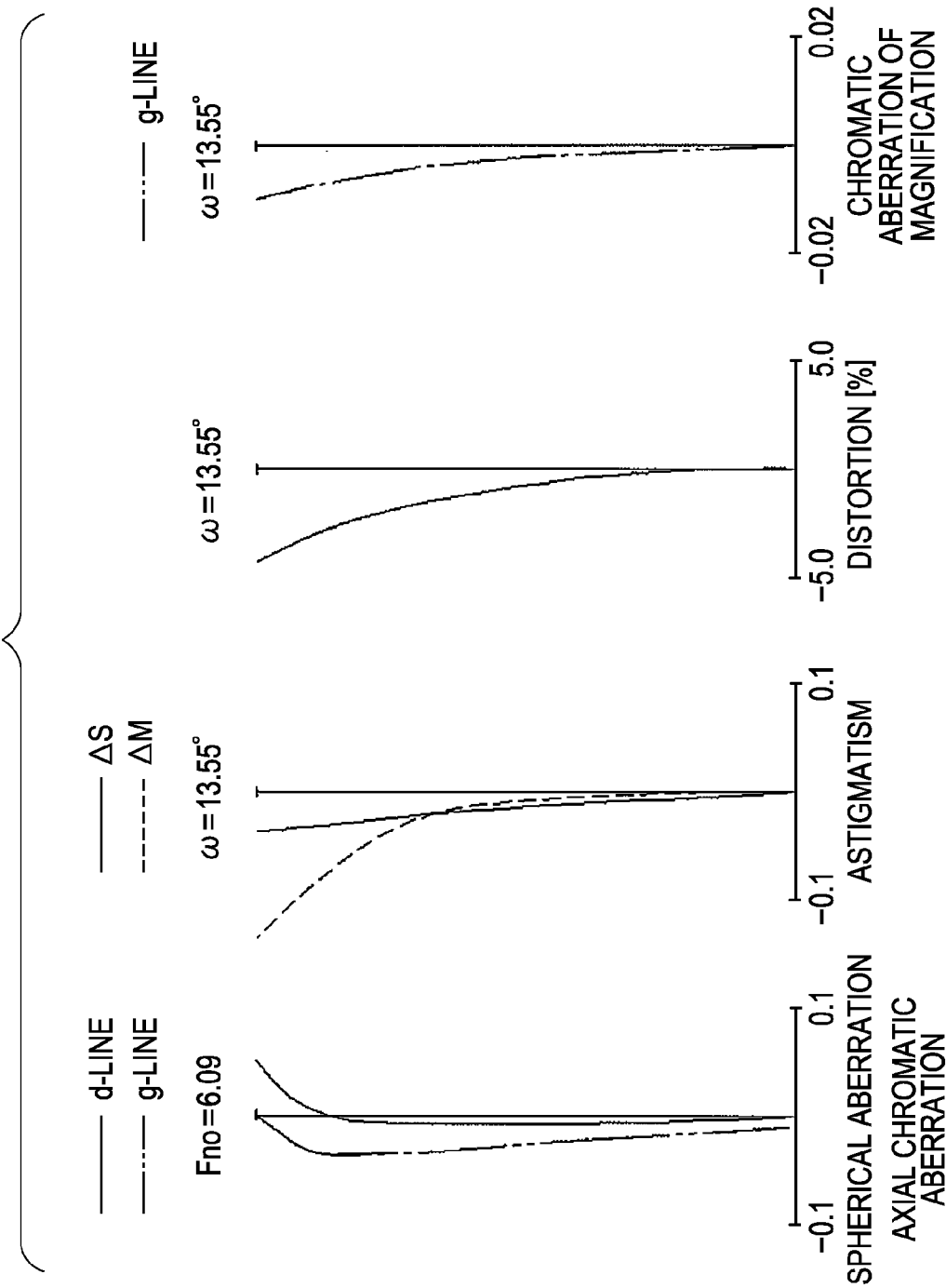
FIG. 4B illustrates aberration diagrams of the zoom lens according to the second embodiment at a middle zoom position.

FIGS. 4A, 4B, and 4C are aberration diagrams of the zoom lens according to the second embodiment at a wide-angle end, a middle zoom position, and a telephoto end, respectively.

The zoom lens according to the second embodiment has a zoom ratio of 4.84 and an F number of 2.64 to 5.41.

Figure 5:
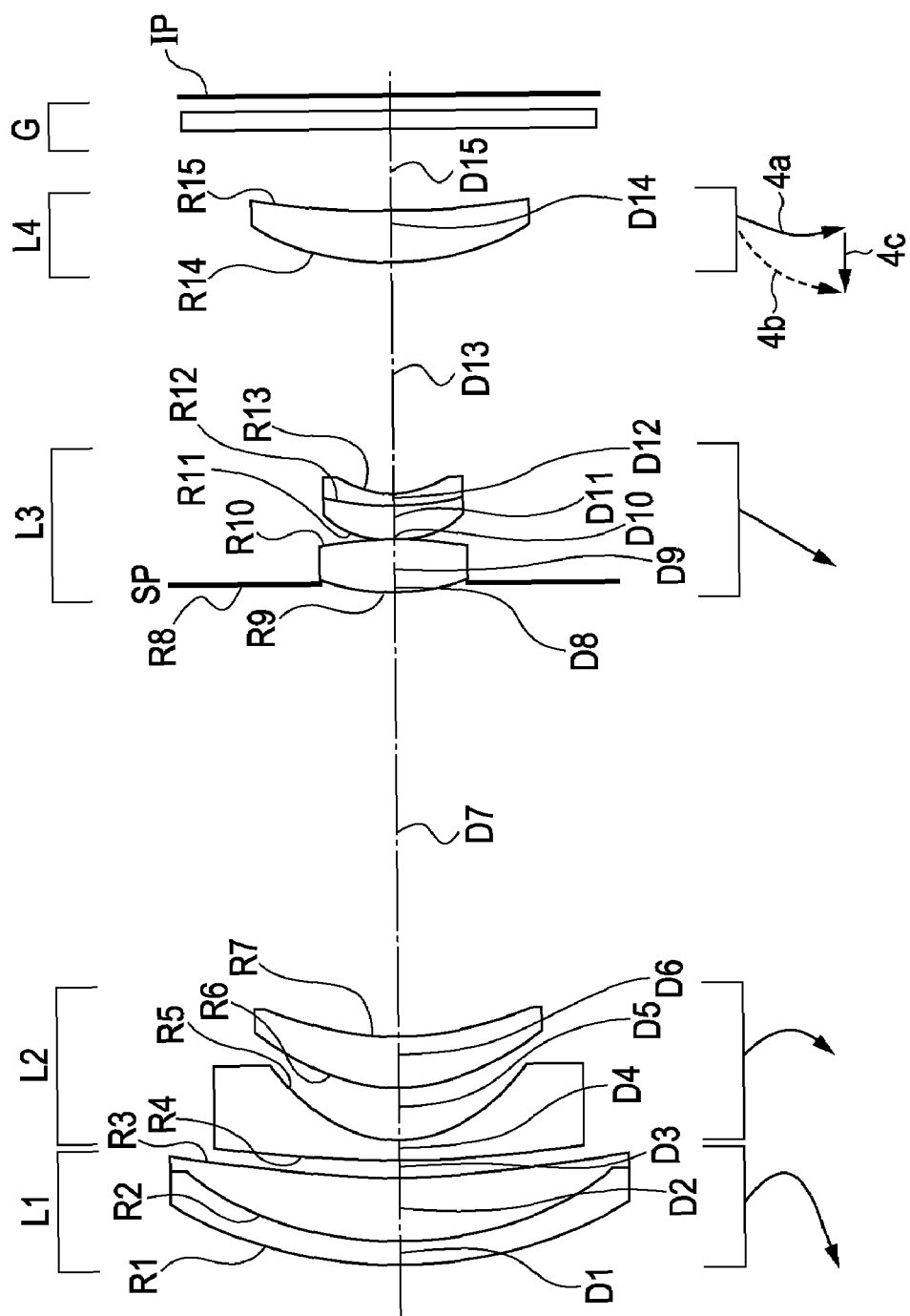
FIG. 5 illustrates a sectional view of a zoom lens according to a third embodiment at a wide-angle end.

FIG. 5 illustrates a sectional view of a zoom lens according to a third embodiment of the present invention at a wide-angle end.

Figure 6C:
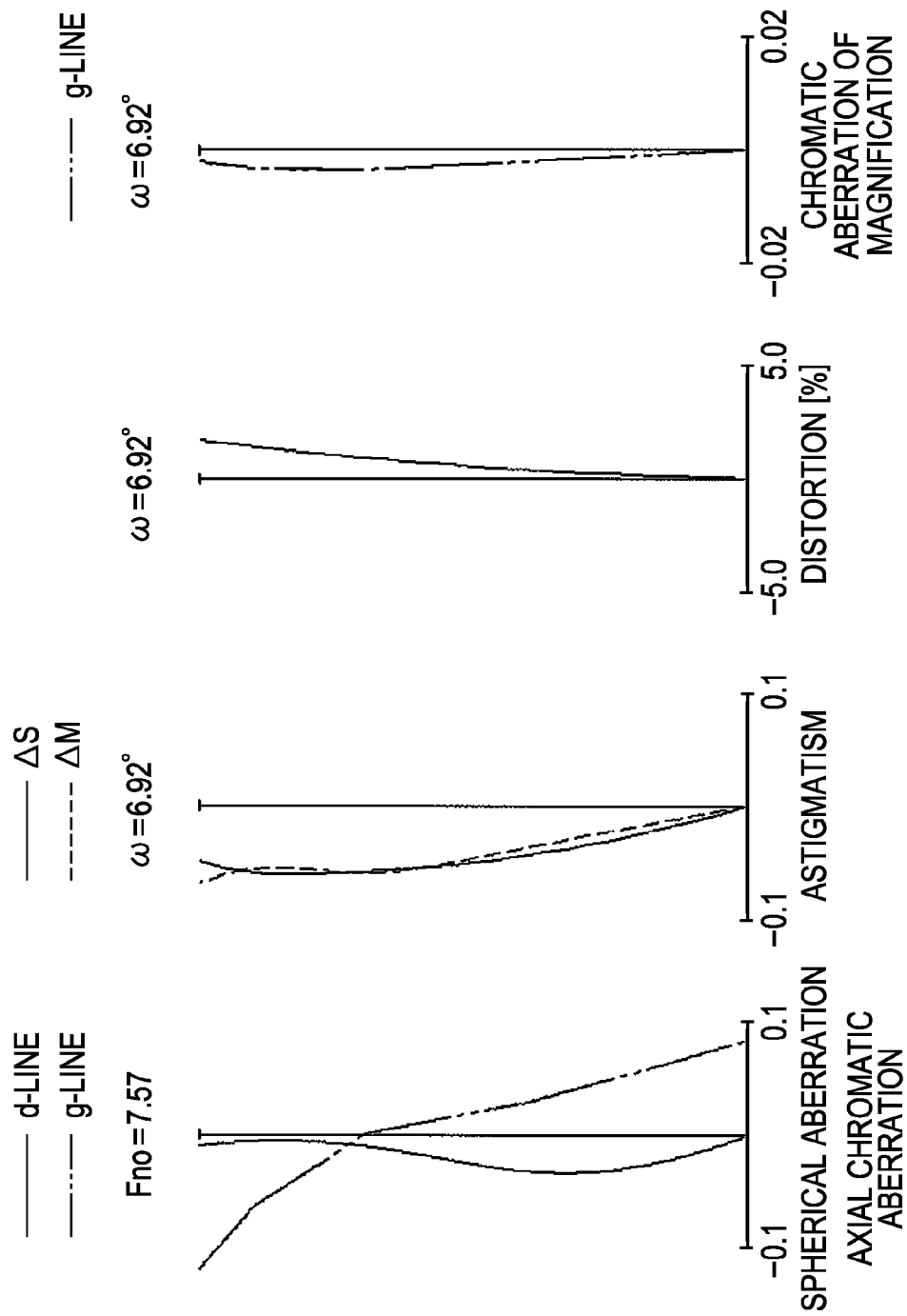
FIG. 6C illustrates aberration diagrams of the zoom lens according to the third embodiment at a telephoto end.

FIGS. 6A, 6B, and 6C are aberration diagrams of the zoom lens according to the third embodiment at a wide-angle end, a middle zoom position, and a telephoto end, respectively.

The zoom lens according to the third embodiment has a zoom ratio of 4.81 and an F number of 2.88 to 4.84.

FIG. 7 illustrates a sectional view of a zoom lens according to a fourth embodiment of the present invention at a wide-angle end.

Figure 8B:
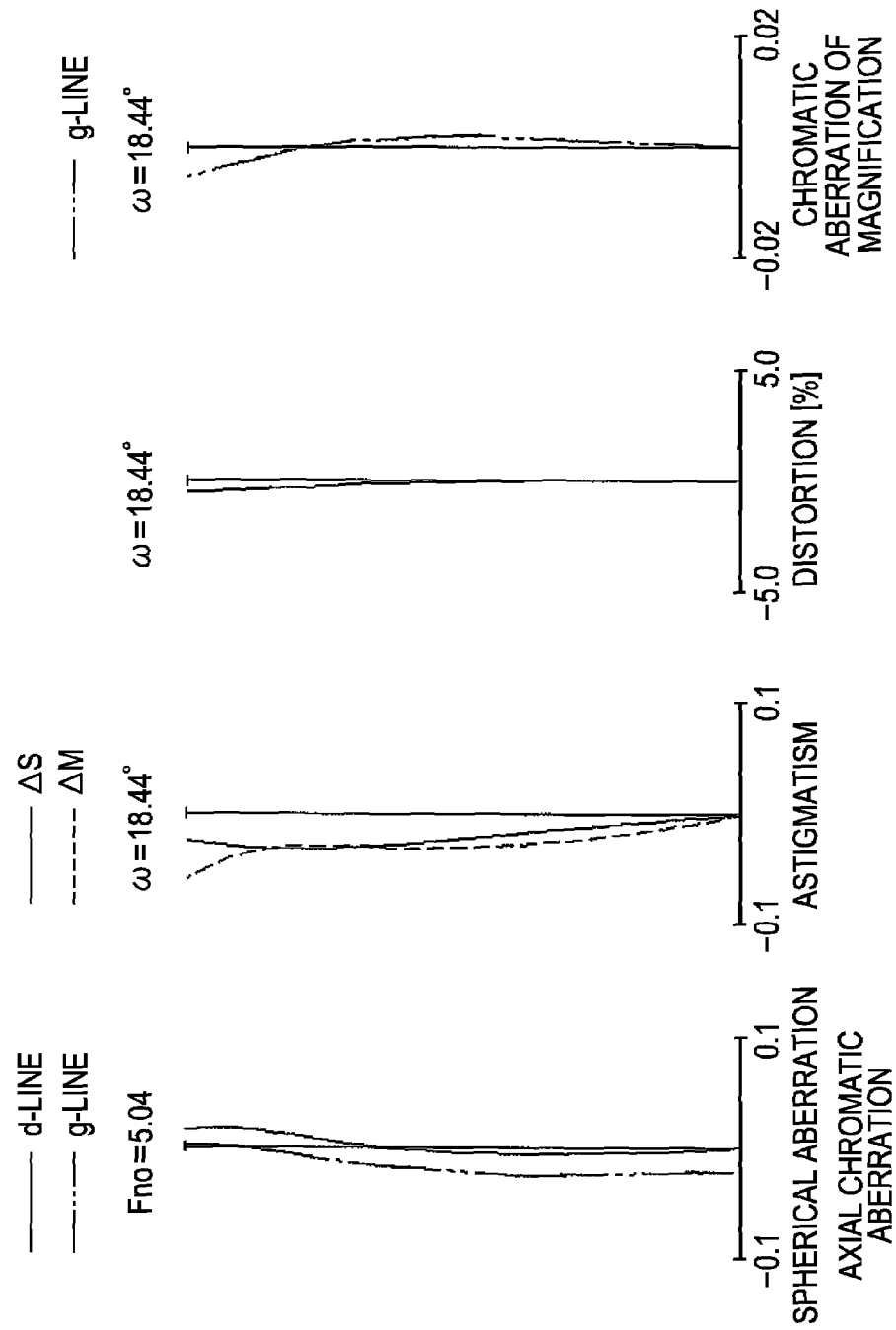
FIG. 8B illustrates aberration diagrams of the zoom lens according to the fourth embodiment at a middle zoom position.

FIGS. 8A, 8B, and 8C are aberration diagrams of the zoom lens according to the fourth embodiment at a wide-angle end, a middle zoom position, and a telephoto end, respectively.

The zoom lens according to the fourth embodiment has a zoom ratio of 4.85 and an F number of 2.88 to 4.90.

Figure 9:
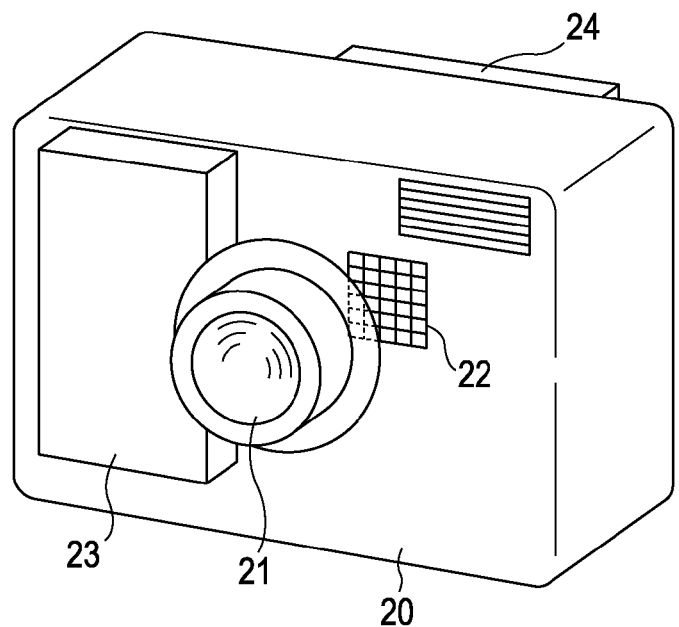
FIG. 9 illustrates a schematic diagram showing the major part of an image pickup apparatus.

FIG. 9 is a schematic diagram showing the major part of an image pickup apparatus including a zoom lens according to at least one embodiment of the present invention.

The zoom lens according to each embodiment can be used as a photographing lens system in an image pickup apparatus, such as a digital still camera and a video camera.

In the sectional views of the zoom lenses, the object side (front) is at the left and the image side (rear) is at the right.

In the case in which the zoom lens according to each embodiment is used as a projector lens in a projector or the like, a screen is at the left and an image to be projected is at the right.

Referring to the sectional views, each zoom lens includes a first lens unit L1 having a positive refractive power (optical power is the reciprocal of focal length), a second lens unit L2 having a negative refractive power, a third lens unit L3 having a positive refractive power, and a fourth lens unit L4 having a positive refractive power.

SP denotes an F-number stop (hereinafter referred to also as an aperture stop) that determines (restricts) the full-aperture F-number (Fno) rays. The aperture stop SP is on the object side of the third lens unit L3 and moves together with or independently of the third lens unit L3 during zooming.

G denotes an optical block corresponding to, for example, an optical filter, a faceplate, a quartz low-pass filter, an infrared-cut filter, etc.

IP denotes an image plane. When the zoom lens of each embodiment is used as an image-forming optical system in a digital still camera or a video camera, the image plane IP is placed on the image pickup plane of a solid-state image pickup device (photoelectric converter), such as a charged coupled device (CCD) sensor and a complementary metal-oxide semiconductor (CMOS) sensor.

When the zoom lens of each embodiment is used as an image-forming optical system of a silver salt film camera, the image plane IP corresponds to a film surface.

In the aberration diagrams, Fno indicates the F number, d and g indicate the d-line and the g-line, respectively, and $\Delta M$ and $\Delta S$ indicate a meridional image plane and a sagittal image plane, respectively. The chromatic aberration of magnification is shown by the g-line.

In each of the embodiments described below, the wide-angle end and the telephoto end are zoom positions corresponding to the states in which the lens unit having the magnification-varying function is at one and the other ends of a moveable range on an optical axis.

The refractive powers of the lens units will now be described below.

Since the first lens unit L1 has a positive refractive power, the spherical aberration and the axial chromatic aberration can be easily corrected, in particular, at the telephoto end.

Since the second lens unit L2 has a negative refractive power, image-plane variation due to field-angle characteristics can be reduced. In addition, the field angle can be easily increased and the overall size of the lens system can be easily reduced by increasing the negative refractive power of the second lens unit L2.

Since the third lens unit L3 has a positive refractive power, the spherical aberration and the astigmatism can be accurately corrected over the entire zoom range.

Since the fourth lens unit L4 has a positive refractive power, high telecentricity can be provided at the image side. The fourth lens unit L4 provides a function as a field lens. Therefore, the zoom lens of each embodiment can be easily used in image pickup apparatuses including solid-state image pickup devices.

The movement of each lens unit during zooming will now be explained.

In each embodiment, the lens units L1 to L4 are moved as shown by the arrows during zooming from the wide-angle end to the telephoto end. The movement of each lens unit will be described in detail.

The first lens unit L1 moves along a locus that is convex toward the image side. The position of the first lens unit L1 at the telephoto end is closer to the object side than that at the wide-angle end.

In general, in the case of determining the front lens diameter by off-axis rays at the wide-angle end, the front lens diameter is determined by the field angle. More specifically, the front lens diameter is increased as the field angle is increased. In comparison, in the case of determining the front lens diameter by the rays at the telephoto end, the front lens diameter is determined by the Fno rays at the telephoto end. More specifically, the front lens diameter is increased as the F number (Fno) at the telephoto end is reduced.

In each embodiment, the amount of movement of the first lens unit L1 during zooming is set to an adequate value so that the front lens diameter is determined at the telephoto end. The F number (Fno) at the telephoto end is reduced within such a range that no damage is caused in a photographing operation, and variation in Fno is set to an adequate range so that the diameter can be increased at the wide-angle end.

The amount of movement of the first lens unit L1 during zooming can be set so as to satisfy the conditional expression (1) given below. Thus, the magnification-varying function obtained by the first lens unit L1 and the second lens unit L2 can be improved and the zoom ratio can be easily increased.

The second lens unit L2 moves along a locus that is convex toward the image side. The position of the second lens unit L2 at the telephoto end is closer to the image side than that at the wide-angle end.

The third lens unit L3 is moved continuously toward the object side. In each embodiment, the third lens unit L3 provides the magnification-varying function together with the second lens unit L2. The amount of movement of the third lens unit L3 can be set so as to satisfy the conditional expression (3) given below. In such a case, a high zoom ratio can be obtained.

In addition, variation in the lateral magnification of the third lens unit L3 during zooming can be set so as to satisfy the conditional expression (6) given below. Thus, variation in Fno during zooming can be adequately set.

In general, Fno of an optical system is defined as follows:

$$Fno = D/fA$$

where D is a diameter (pupil diameter) and f is a focal length of the entire optical system.

In each embodiment, the zoom lens includes lens units having a positive refractive power, a negative refractive power, a positive refractive power, and a positive refractive power. The aperture stop SP is positioned near the third lens unit L3. If the position of the fourth lens unit L4 at the wide-angle end is substantially the same as that at the telephoto end, the distance between the third lens unit L3 and the image point of the third lens unit L3 is substantially equivalent to the distance between the aperture stop SP and the image plane.

If the pupil diameter is constant, Fno is increased (brightness is reduced) as the distance between the aperture stop SP and the image plane is increased. In other words, variation in Fno is increased as the amount of movement of the third lens unit L3 is increased.

The above-described relationship will be explained using equations. First, the distance between the third lens unit L3 and the image point of the third lens unit L3 can be expressed as follows:

$$S3 = (1-\beta 3T) \cdot f3 \qquad (B)$$

where $\beta 3T$ is the lateral magnification of the third lens unit L3 at the telephoto end, f3 is the focal length of the third lens unit L3, and S3 is the distance between the principal point of the third lens unit L3 and the image point of the third lens unit L3. Variation in Fno can be expressed using equation (B) as follows:

$$\Delta Fno = \{(1-\beta 3T) \cdot f3\}/\{(1-\beta 3W) \cdot f3\} \qquad (C)$$

where $\beta 3w$ is the lateral magnification of the third lens unit L3 at the wide-angle end.

When FnoW and FnoT are F numbers at the wide-angle end and the telephoto end, respectively, $\Delta$Fno can be expressed as follows:

$$\Delta Fno \approx FnoT/Fnow \qquad (D)$$

In each embodiment, the amount of movement of the third lens unit can be set so as to satisfy the conditional expression (3) given below, so that Fno at the telephoto end can be reduced within such a range that no damage is caused in the photographing operation. Thus, variation in Fno during zooming is set to an adequate level so as to increase the diameter at the wide-angle end.

The fourth lens unit L4 moves along a locus that is convex toward the object side.

With regard to the distances between the lens units, the distance between the first lens unit L1 and the second lens unit L2 at the telephoto end is larger than that at the wide-angle end. The distance between the second lens unit L2 and the third lens unit L3 at the telephoto end is smaller than that at the wide-angle end. The distance between the third lens unit L3 and the fourth lens unit L4 at the telephoto end is larger than that at the wide-angle end.

In each embodiment, during zooming from the wide-angle end to the telephoto end, the magnification-varying function is obtained by moving the third lens unit L3 and the second lens unit L2 independently of each other.

In each embodiment, the magnification-varying function is mainly provided by the movement of the third lens unit L3 toward the object side. The magnification-varying function is also obtained by the movement of the second lens unit L2 along a locus that is convex toward the image side.

In each embodiment, the refractive powers and the arrangement of the lens units are set such that a refractive-power distribution of a substantially retrofocus type can be obtained as a whole at the wide-angle end.

In addition, the refractive powers and the arrangement of the lens units are set such that a refractive-power distribution of a substantially telephoto type can be obtained as a whole at the telephoto end. As a result, a zoom lens with a high zoom ratio can be obtained.

The zooming operation and correction of the image-plane variation caused by the variation in magnification are performed by moving all of the lens units. Therefore, efficient distribution of the refractive powers can be easily provided.

In addition, the overall length of the optical system at the wide-angle end is reduced so that a small, high-zoom-ratio zoom lens that is suitable for use in, for example, a digital camera can be obtained.

In each embodiment, a rear-focus method is used in which focusing is performed by moving the fourth lens unit L4 along the optical axis.

Focusing from an object at infinity to a close object at the telephoto end can be performed by moving the fourth lens unit forward, as shown by the arrow 4c.

The solid curve 4a represents a locus of the fourth lens unit L4 for correcting the image-plane variation during zooming from the wide-angle end to the telephoto end while an object at infinity is in focus. The dashed curve 4b represents a locus of the fourth lens unit L4 for correcting the image-plane variation during zooming from the wide-angle end to the telephoto end while a close object is in focus.

In each embodiment, focusing can be quickly performed because the fourth lens unit L4, which is structured to be light, is moved for focusing.

Although not described in the embodiments, the first lens unit L1 can also be moved continuously toward the object side and the second lens unit L2 can also be moved continuously toward the image side during zooming from the wide-angle end to the telephoto end. Also in such a case, the above-described effects can be obtained.

In each embodiment, the third lens unit L3 can be moved in a direction having a component perpendicular to the optical axis so as to prevent the image blur when the entire optical system vibrates.

Thus, an image stabilizing function can be obtained without using an additional optical element, such as a variable angle prism, or a lens unit dedicated to the image stabilizing function. Consequently, the size of the entire optical system is prevented from being increased.

In each embodiment, the zoom lens includes four lens units. However, a lens unit having a refractive power or a converter lens unit can be placed on the object side of the first lens unit L1 or the image side of the fourth lens unit L4 as necessary.

Characteristics of the lens structure of each lens unit included in the zoom lens of each embodiment will now be described.

In each embodiment, the lens units include lens elements described below in order from the object side to the image side.

First, first to third embodiments will be described.

In the first to third embodiments, the lens units include lens elements described below in order from the object side to the image side.

The first lens unit L1 includes a cemented lens of a negative lens and a positive lens. The cemented lens has a meniscus shape and is convex on the object side.

The number of lenses included in the first lens unit L1 is two or less.

The second lens unit L2 consists of a negative lens having a concave surface on the image side and a positive lens having a convex surface on the object side. The negative lens has aspheric surfaces on both sides thereof.

The third lens unit L3 includes a biconvex positive lens and a cemented lens of a positive lens and a negative lens. The cemented lens has a meniscus shape and is convex on the object side.

The fourth lens unit L4 includes a single biconvex positive lens or a single positive lens having a meniscus shape with a convex surface on the object side.

Thus, in the first to third embodiments, eight lenses are used in total and high optical performance is provided while the overall size of the optical system is reduced.

Characteristics of the lens structures of the lens units included in the zoom lenses according to the first to third embodiments will not be described.

In the zoom lenses according to the first to third embodiments, the first lens unit L1 having a positive refractive power has the largest effective diameter. Since the first lens unit L1 includes the cemented lens, the thickness of the first lens unit L1 is reduced and the height at which the off-axis rays are incident on the first lens unit L1 at the wide-angle end can be reduced. As a result, the size of the first lens unit L1 is reduced.

In addition, since the first lens unit L1 includes two lenses, which are a positive lens and a negative lens, the chromatic aberration of magnification can be accurately corrected during zooming from the wide-angle end to the telephoto end. In addition, the axial chromatic aberration can be accurately corrected at the telephoto end.

The second lens unit L2 is configured to have a high negative refractive power to reduce the front lens diameter. In the first to third embodiments, the number of lenses included in the second lens unit L2 is two. Therefore, compared to the structure in which the second lens unit L2 consists of a single lens, the aberrations can be more accurately corrected while the high refractive power is maintained.

In addition, compared to the structure in which the second lens unit L2 consists of three lenses, the lens structure is made simpler while the high zoom ratio is maintained by forming the lenses included in the second lens unit L2 with a high-refractive-index glass material.

The second lens unit L2 having a negative refractive power provides the magnification-varying function together with the third lens unit L3. In the first to third embodiments, the refractive powers of the second lens unit L2 and the third lens unit L3 can be set so as to satisfy the conditional expression (4) given below. In such a case, the front lens diameter can be reduced while a high zoom ratio is ensured.

The negative lens included in the second lens unit L2 has at least one aspheric surface. More specifically, the negative lens has aspheric surfaces on both sides thereof. Therefore, aberration variation during zooming can be accurately corrected.

The third lens unit L3 having a positive refractive power is disposed near the aperture stop SP. The third lens unit L3 causes large spherical aberration and axial aberrations, such as the axial chromatic aberration, over the entire zoom range.

Therefore, in the first to third embodiments, the refractive power of the third lens unit L3 is set so as to satisfy the conditional expression (2) given below, so that high optical performance can be obtained.

The positive refractive power of the third lens unit L3 is obtained by two lenses, so that the spherical aberration can be accurately corrected. The axial chromatic aberration caused by the positive lens is corrected by the negative lens. Due to this lens structure, high optical performance can be obtained by a small number of lenses.

In the zoom lens according to each of the first to third embodiments, to accurately correct the optical performance in the image stabilizing operation, the lateral magnification of the third lens unit L3, which is a shift lens unit, and the lateral magnification of the fourth lens unit L4, which is disposed behind the third lens unit L3, are set so as to satisfy the conditional expression (5) given below. In general, the amount of movement Δ of the image point on the image plane caused when a shift lens unit A is shifted by 1 mm can be expressed as follows:

$$\Delta = (1 - \beta A) \cdot \beta B \tag{E}$$

where Δ is the amount of movement of the image point on the image plane, βA is the lateral magnification of the shift lens unit, and βB is the lateral magnification of the lens unit disposed behind the shift lens unit.

In the zoom lens according to each of the first to third embodiments, the image stabilizing operation (correction of image blur) is performed by shifting the third lens unit L3. In other words, the third lens unit L3 functions as the shift lens unit and the fourth lens unit L4 functions as the lens unit disposed behind the shift lens unit.

In the first to third embodiments, the lateral magnifications of the third lens unit L3 and the fourth lens unit L4 are set such that the amount of movement Δ in equation (E) can be set to an adequate value.

The third lens unit L3 includes one or more aspheric surfaces, so that aberration variation during zooming can be accurately corrected.

Figure 10:
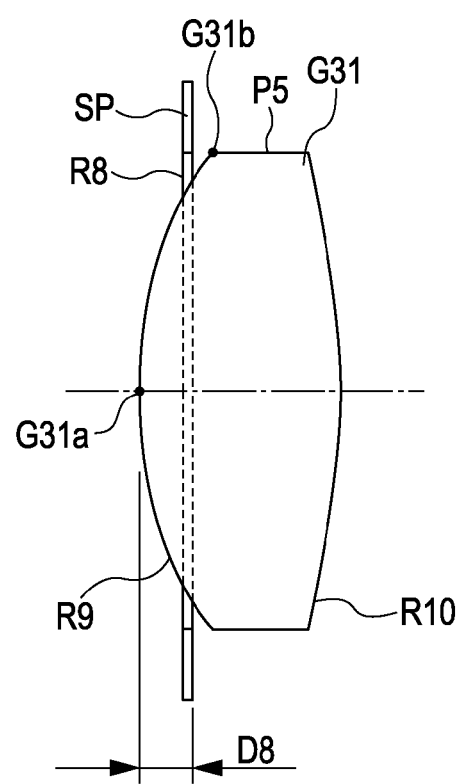
FIG. 10 illustrates a schematic diagram showing an F-number stop.

FIG. 10 illustrates the arrangement of an F-number stop SP provided on the third lens unit L3.

As shown in FIG. 10, the F-number stop SP is positioned between a vertex G31a of an object-side surface R9 of a lens G31 and an intersecting point G31b of the object-side surface R9 and a peripheral portion (edge portion) P5 of the lens G31 in the direction of the optical axis. The lens G31 is closest to the object side in the third lens unit L3.

Thus, the F-number stop SP is disposed in the third lens unit L3 and is moved together with the third lens unit L3 during zooming, so that the distance between the entrance pupil and the second lens unit L2 is reduced in the wide-angle region.

When the aperture stop SP is disposed as described above, the distance between the second lens unit L2 and the third lens unit L3 can be reduced at the telephoto end. Therefore, the distance by which the third lens unit L3 can be moved toward the object side during zooming is ensured, and the zoom ratio can be increased without increasing the overall length of the lens system at the telephoto end.

The fourth lens unit L4 having a positive refractive power efficiently corrects off-axis aberrations and the axial aberrations that cannot be sufficiently corrected by the third lens unit L3.

The fourth lens unit L4 has an aspheric surface on the object side so that aberration variation can be reduced during focusing.

The lens structure of each lens unit in the fourth embodiment will now be described.

In the fourth embodiment, the lens structures of the first lens unit L1 and the fourth lens unit L4 are different from those in the first to third embodiments. The structures of the other lens units are similar to those in the first to third embodiments.

In the fourth embodiment, the lens units include lens elements described below in order from the object side to the image side.

The first lens unit L1 includes a single positive lens. The positive lens has a meniscus shape and is convex on the object side.

The second lens unit L2 consists of a biconcave negative lens and a positive lens having a convex surface on the object side. The negative lens has aspheric surfaces on both sides thereof.

The third lens unit L3 includes a biconvex positive lens and a cemented lens of a positive lens and a negative lens. The cemented lens has a meniscus shape and is convex on the object side.

The fourth lens unit L4 includes a cemented lens of a positive lens and a negative lens. The cemented lens has a meniscus shape and is convex on the object side.

In the fourth embodiment, eight lenses are used in total and high optical performance is provided while the overall size of the optical system is reduced.

In the zoom lens according to the fourth embodiment, the first lens unit L1 having a positive refractive power has the largest effective diameter. The first lens unit L1 includes a single lens so that the overall size of the optical system is reduced.

The positive lens included in the first lens unit L1 is made of a low-dispersion material, so that the axial chromatic aberration can be accurately corrected, in particular, at the telephoto end.

Characteristics of the lens structures of the second lens unit L2 and the third lens unit L3 are similar to those of the first to third embodiments.

The fourth lens unit L4 having a positive refractive power efficiently corrects the off-axis aberrations and the axial aberrations that cannot be sufficiently corrected by the third lens unit L3. In addition, in the fourth embodiment, the chromatic aberration of magnification that cannot be sufficiently corrected by the first lens unit L1 including a single positive lens is corrected, in particular, at the telephoto end, by the positive lens and the negative lens included in the fourth lens unit L4.

As described above, although the zoom lens according to each of the above-described embodiments includes eight lenses and the overall length of the lens system is reduced, high optical performance with a zoom ratio of 4.5 or more and high brightness can be obtained.

In the zoom lens according to each of the embodiments, to further improve the optical performance or to further reduce the overall size of the lens system, one or more of the conditional expressions given below can be satisfied. In such a case, effects corresponding to the conditional expressions can be obtained.

In the conditional expressions, the focal lengths of the entire lens system at the wide-angle end and the telephoto end are indicated by fw and fT, respectively.

The amounts of movement of the first lens unit L1 and the third lens unit L3 in the optical-axis direction during zooming from the wide-angle end to the telephoto end are indicated by m1 and m3, respectively. With regard to the sign of the amount of movement, the positive sign represents the movement toward the image side, and the negative sign represents the movement toward the object side.

If the movement is a reciprocating movement, the position at the wide-angle end is used as a reference and the difference between the position at the wide-angle end and the position at the telephoto end is determined as the amount of movement.

The focal lengths of the second lens unit L2 and the third lens unit L3 are indicated by f2 and f3, respectively.

The lateral magnifications of the third lens unit L3 at the wide-angle end and the telephoto end are indicated by β3w and β3T, respectively.

The lateral magnification of the fourth lens unit L4 at the telephoto end is indicated by β4T.

The refractive indices of the materials of the negative lens and the positive lens included in the second lens unit L2 are indicated by N2N and N2P, respectively.

The Abbe numbers of the materials of the positive lens and the negative lens forming the cemented lens included in the third lens unit L3 are indicated by ν3P and ν3N, respectively.

The conditional expressions are as follows:

$$-1.3 < m1/\sqrt{(fw \cdot fT)} < -0.8 \quad (1)$$

$$1.0 < f3/fw < 2.5 \quad (2)$$

$$-2.2 < m3/fw < -1.6 \quad (3)$$

$$-1.5 < f2/f3 < -0.8 \quad (4)$$

$$1.0 < (1-\beta 3T) \cdot \beta 4T < 3.0 \quad (5)$$

$$1.0 < (1-\beta 3T)/(1-\beta 3W) < 2.0 \quad (6)$$

$$(N2P+N2N)/2 > 1.85 \quad (7)$$

$$18 < \nu 3P - \nu 3N < 24 \quad (8)$$

The technical meaning of each conditional expression will now be described.

Conditional expression (1) represents the condition for adequately setting the amount of movement of the first lens unit L1 during zooming and accurately correcting the aberration variation during zooming when the front lens diameter is reduced and a zoom ratio of 4.5 or more is obtained.

If the amount of movement m1 of the first lens unit L1 is small and the value of conditional expression (1) is above the higher limit thereof, the magnification-varying function obtained by the first lens unit L1 and the second lens unit L2 is small.

In such a case, the amount of movement of the third lens unit L3 must be increased to obtain a desired zoom ratio. However, the distance between the second lens unit L2 and the third lens unit L3 at the wide-angle end must be increased to prevent the third lens unit L3 from interfering with the second lens unit L2. Consequently, the overall length of the lens system is increased at the wide-angle end.

If the amount of movement m1 of the first lens unit L1 is large and the value of conditional expression (1) is below the lower limit thereof, the overall length of the lens system is increased at the telephoto end. As a result, when the zoom lens has a retractable structure in which the lens units can be retracted, the number of retracting units is increased and the lens barrel structure becomes complex.

The value of conditional expression (2) is obtained by normalizing the focal length of the third lens unit L3 with the focal length fw of the entire system at the wide-angle end.

If the focal length of the third lens unit L3 is increased such that the value of conditional expression (2) is above the upper limit thereof, that is, if the refractive power of the third lens unit L3 is too low, aberration variation during zooming is reduced. However, the amount of movement of the third lens unit L3 during zooming is increased and the overall length of the lens system is increased at the telephoto end.

If the focal length of the third lens unit L3 is reduced such that the value of conditional expression (2) is below the lower limit thereof, that is, if the refractive power of the third lens unit L3 is too high, it becomes difficult to correct the spherical aberration in the entire zoom range and the chromatic spherical aberration at the telephoto end.

The value of conditional expression (3) is obtained by normalizing the amount of movement m3 of the third lens unit L3 during zooming with the focal length fw of the entire system at the wide-angle end.

If the amount of movement m3 of the third lens unit L3 is increased such that the value of conditional expression (3) is above the upper limit, the amount of movement of the first lens unit L1 for correcting the image-plane variation during zooming is increased. As a result, the overall length of the lens system is increased at the telephoto end and the front lens diameter is increased accordingly.

If the amount of movement m3 of the third lens unit L3 is reduced such that the value of conditional expression (3) is below the lower limit, variation in Fno during zooming is reduced. Therefore, the diameter cannot be increased at the wide-angle end.

The value of conditional expression (4) is obtained by normalizing the focal length of the second lens unit L2 with the focal length of the third lens unit L3. If the focal length of the second lens unit L2 is increased such that the value of conditional expression (4) is above the upper limit thereof, that is, if the refractive power of the second lens unit L2 is too low, it becomes difficult to correct the chromatic aberration of magnification during zooming.

If the focal length of the second lens unit L2 is reduced such that the value of conditional expression (4) is below the lower limit thereof, that is, if the refractive power of the second lens unit L2 is too high, the Petzval sum is increased in a negative direction. Therefore, the image plane is excessively corrected, in particular, at the wide-angle end. To prevent this, the refractive power must be provided by two or more lenses and the number of lenses included in the second lens unit L2 must be increased.

Conditional expression (5) relates to sensitivity to eccentricity of the third lens unit L3. If the value of conditional expression (5) is above the upper limit thereof, the sensitivity to eccentricity is too high. Therefore, although the amount of movement of the shift lens unit (third lens unit L3) required in the image stabilizing operation can be reduced, mechanical control for adequately performing the image stabilizing operation becomes difficult.

If the value of conditional expression (5) is below the lower limit thereof, the sensitivity to eccentricity is too low. Therefore, although the mechanical control for the image stabilizing operation can be simplified, the amount of movement of the shift lens unit required in the image stabilizing operation is increased. As a result, the optical performance is largely degraded due to the image stabilizing operation.

Conditional expression (6) relates to variation in F number (Fno) during zooming.

If the value of conditional expression (6) is above the upper limit thereof, variation in Fno during zooming is too large and Fno becomes lower than a desired value at the wide-angle end. As a result, it becomes difficult to correct the spherical aberration and the coma aberration at the wide-angle end.

If the value of conditional expression (6) is below the lower limit thereof, variation in Fno during zooming is too small and the diameter cannot be increased at the wide-angle end.

Conditional expression (7) relates to the average refractive index of the lenses included in the second lens unit L2.

If the average refractive index is below the lower limit of conditional expression (7), the curvature of the surface of each lens is increased. Therefore, the uneven thickness ratio of the negative lens is increased and the lens volume is increased accordingly. In addition, the on-axis lens thickness of the positive lens is increased to ensure the edge thickness thereof, and therefore the size of the second lens unit L2 is increased. In addition, if the average refractive index is below the lower limit of conditional expression (7), the volume of the second lens unit L2 is increased, and the overall length of the lens system is increased accordingly.

Conditional expression (8) relates to the difference in the Abbe number between the materials of the positive lens and the negative lens forming the cemented lens in the third lens unit L3.

If the difference in the Abbe number is larger than the upper limit of conditional expression (8), the axial chromatic aberration is excessively corrected, in particular, at the telephoto end.

If the difference in the Abbe number is smaller than the lower limit of conditional expression (8), the chromatic spherical aberration cannot be sufficiently corrected, in particular, at the telephoto end.

In each of the above-described embodiments, the numerical ranges of conditional expression (1) to (8) can also be set as follows:

$$-1.2 < m1/\sqrt{(fw \cdot fT)} < -0.9 \tag{1a}$$

$$1.6 < f3/fw < 1.9 \tag{2a}$$

$$-2.1 < m3/fw < -1.6 \tag{3a}$$

$$-1.0 < f2/f3 < -0.8 \tag{4a}$$

$$1.3 < (1-\beta 3T) \cdot \beta 4T < 2.0 \tag{5a}$$

$$1.3 < (1-\beta 3T)/(1\beta 3W) < 1.8 \quad (6a)$$

$$(N2P+N2N)/2 > 1.88 \quad (7a)$$

$$20 < \nu 3P - \nu 3N < 22 \quad (8a)$$

As described above, according to each of the above-described embodiments, the lens structure of each lens unit, the positions of aspheric surfaces, the method of moving each lens unit during zooming, etc., are adequately determined. Thus, a zoom lens is provided which includes a small number of lenses so that the overall length thereof can be reduced, which is capable of providing high optical performance with a zoom ratio of 4.5 or more and small Fno, and which is suitable for use in, for example, a digital still camera.

Numerical examples according to the present invention will now be described. In each numerical example, indicates the surface number counted from the object side, Ri indicates the radius of curvature of the $i^{th}$ lens surface ($i^{th}$ surface), Di indicates the distance between the $i^{th}$ and $(i+1)^{th}$ lens surfaces, and Ni and νi indicate the refractive index and the Abbe number, respectively, based on the d-line.

Two surfaces closest to the image side are surfaces forming a filter member, such as a quartz low-pass filter, an infrared-cut filter, etc.

When X is the displacement from the vertex of an aspheric surface in the optical-axis direction at a height of h from the optical axis, the shape of the aspheric surface is expressed as follows:

$$X = (h^2/R)/[1+\{1-(1+k)(h/R)^2\}^{1/2}]Ah^2 + Bh^4 + Ch^6 + Dh^8 + Eh^{10}Fh^{12}$$

where k is the conic constant, A, B, C, D, and E are the aspherical coefficients for the second, fourth, sixth, eight, tenth, and twelfth orders, respectively, and R is the paraxial radius of curvature.

In addition, "e−0X" indicates "$\times 10^{-x}$." In addition, f is the focal length, Fno is the F number, and ω is the half field angle.

Table 1 provided below shows the values of the above-described conditional expressions in each numerical example.

The values of D8 in the first to third numerical examples and the value of D7 in the fourth numerical example are negative since the F-number stop and the lens G31 in the third lens unit L3 are counted in that order from the object side.

More specifically, the F-number stop (aperture stop) SP is closer to the image side than the vertex G31a of the object-side surface R9 (or R8) of the lens G31 positioned closest to the object side in the third lens unit L3 by a distance corresponding to the absolute value of D8 (or D7).

First Numerical Example

| f = 6.58~31.89 Fno = 2.63~4.96 2ω = 60.5°~13.7° | | | | | | | |
|---|---|---|---|---|---|---|---|
| R1 = | 18.156 | D1 = | 0.87 | N1 = | 1.84666 | ν1 = | 23.93 |
| R2 = | 13.919 | D2 = | 2.76 | N2 = | 1.62299 | ν2 = | 58.16 |
| R3 = | 72.157 | D3 = | Variable | | | | |
| * R4 = | 19895.562 | D4 = | 0.70 | N4 = | 1.85960 | ν4 = | 40.40 |
| * R5 = | 5.273 | D5 = | 2.48 | | | | |
| R6 = | 10.771 | D6 = | 1.71 | N6 = | 1.92286 | ν6 = | 18.90 |
| R7 = | 26.012 | D7 = | Variable | | | | |
| R8 = | Aperture | D8 = | −0.30 | | | | |
| * R9 = | 5.591 | D9 = | 2.50 | N9 = | 1.51823 | ν9 = | 58.90 |
| R10 = | −13.388 | D10 = | 0 | | | | |
| R11 = | 5.522 | D11 = | 2.03 | N11 = | 1.74400 | ν11 = | 44.78 |
| R12 = | 52.417 | D12 = | 0.89 | N12 = | 1.84666 | ν12 = | 23.78 |
| R13 = | 3.636 | D13 = | Variable | | | | |
| * R14 = | 8.090 | D14 = | 2.60 | N14 = | 1.58313 | ν14 = | 59.40 |
| R15 = | −53.744 | D15 = | Variable | | | | |
| R16 = | ∞ | D16 = | 0.72 | N16 = | 1.51633 | ν16 = | 64.14 |
| R17 = | ∞ | | | | | | |

| | Focal Length | | |
|---|---|---|---|
| Variable Distance | 6.58 | 15.91 | 31.89 |
| D3 | 1.14 | 8.88 | 15.38 |
| D7 | 11.50 | 2.07 | 0.78 |
| D13 | 4.55 | 7.30 | 17.38 |
| D15 | 3.20 | 5.82 | 2.26 |

| Aspherical Coefficients | | | | | | |
|---|---|---|---|---|---|---|
| 4th Surface | K = | −1.55114E+11 | | | | |
| | A = | −8.57773E−03 | B = | 1.96683E−05 | C = | 5.26031E−06 |
| | D = | −6.22285E−08 | E = | 9.76602E−10 | F = | −4.03491E−11 |
| 5th Surface | K = | −3.68708E+00 | | | | |
| | A = | −2.22979E−03 | B = | 2.45160E−03 | C = | −7.87695E−05 |
| | D = | 2.81346E−06 | E = | −3.11063E−09 | F = | −1.50969E−09 |
| 9th Surface | K = | −1.26302E+00 | | | | |
| | A = | −2.90768E−02 | B = | −3.16506E−05 | C = | −6.33294E−06 |
| | D = | 4.21168E−07 | E = | −2.46592E−08 | F = | 1.82632E−09 |
| 14th Surface | K = | −2.98146E−01 | | | | |
| | A = | −1.33524E−02 | B = | −6.71518E−05 | C = | −3.48944E−07 |
| | D = | −2.22719E−08 | E = | 7.60882E−09 | F = | −2.27799E−10 |

Second Numerical Example

| f = 6.59~31.87 Fno = 2.64~5.41 2ω = 60.5°~13.7° | | | | | | | |
|---|---|---|---|---|---|---|---|
| R1 = | 16.292 | D1 = | 0.87 | N1 = | 1.84666 | ν1 = | 23.93 |
| R2 = | 12.874 | D2 = | 2.50 | N2 = | 1.62299 | ν2 = | 58.16 |
| R3 = | 34.101 | D3 = | Variable | | | | |
| * R4 = | 24213.428 | D4 = | 0.70 | N4 = | 1.85960 | ν4 = | 40.40 |
| * R5 = | 5.290 | D5 = | 2.58 | | | | |
| R6 = | 10.918 | D6 = | 1.59 | N6 = | 1.92286 | ν6 = | 18.90 |
| R7 = | 25.415 | D7 = | Variable | | | | |
| R8 = | Aperture | D8 = | −0.30 | | | | |
| * R9 = | 6.143 | D9 = | 2.88 | N9 = | 1.51823 | ν9 = | 58.90 |
| R10 = | −13.828 | D10 = | 0 | | | | |
| R11 = | 5.238 | D11 = | 1.95 | N11 = | 1.74400 | ν11 = | 44.78 |
| R12 = | 33.706 | D12 = | 0.86 | N12 = | 1.84666 | ν12 = | 23.78 |
| R13 = | 3.727 | D13 = | Variable | | | | |
| * R14 = | 8.339 | D14 = | 2.76 | N14 = | 1.58313 | ν14 = | 59.40 |
| R15 = | 142.503 | D15 = | Variable | | | | |
| R16 = | ∞ | D16 = | 0.72 | N16 = | 1.51633 | ν16 = | 64.14 |
| R17 = | ∞ | | | | | | |

| | Focal Length | | |
|---|---|---|---|
| Variable Distance | 6.59 | 15.94 | 31.87 |
| D3 | 1.06 | 10.11 | 17.45 |
| D7 | 13.40 | 2.51 | 1.05 |
| D13 | 4.77 | 8.13 | 19.41 |
| D15 | 3.20 | 5.52 | 1.75 |

| Aspherical Coefficients | | | | | | |
|---|---|---|---|---|---|---|
| 4th Surface | K = | −1.55114E+11 | | | | |
| | A = | −1.70246E−03 | B = | 1.21945E−04 | C = | 1.49847E−06 |
| | D = | −5.62598E−08 | E = | 9.94957E−10 | F = | −1.19636E−11 |
| 5th Surface | K = | −3.45531E+00 | | | | |
| | A = | −5.12588E−03 | B = | 2.46889E−03 | C = | −7.60693E−05 |
| | D = | 3.12341E−06 | E = | −6.58254E−08 | F = | 4.53055E−10 |
| 9th Surface | K = | −1.27815E+00 | | | | |
| | A = | −3.20280E−02 | B = | −2.15613E−05 | C = | −3.61988E−06 |
| | D = | 6.10894E−07 | E = | −6.13940E−08 | F = | 7.11943E−10 |
| 14th Surface | K = | −8.07022E−02 | | | | |
| | A = | −3.90466E−03 | B = | −1.10500E−04 | C = | 3.39318E−06 |
| | D = | −1.08638E−07 | E = | 3.07644E−09 | F = | −4.19083E−11 |

Third Numerical Example

| f = 6.58~31.65 Fno = 2.88~4.84 2ω = 60.6°~13.8° | | | | | | | |
|---|---|---|---|---|---|---|---|
| R1 = | 17.446 | D1 = | 0.87 | N1 = | 1.84666 | ν1 = | 23.93 |
| R2 = | 13.487 | D2 = | 2.47 | N2 = | 1.69680 | ν2 = | 55.53 |
| R3 = | 39.058 | D3 = | Variable | | | | |
| * R4 = | −6037.659 | D4 = | 0.70 | N4 = | 1.85960 | ν4 = | 40.40 |
| * R5 = | 4.913 | D5 = | 2.03 | | | | |
| R6 = | 7.95 | D6 = | 1.90 | N6 = | 1.92286 | ν6 = | 18.90 |
| R7 = | 12.632 | D7 = | Variable | | | | |
| R8 = | Aperture | D8 = | −0.30 | | | | |
| * R9 = | 8.051 | D9 = | 2.0 | N9 = | 1.51823 | ν9 = | 58.90 |
| R10 = | −15.46 | D10 = | 0 | | | | |
| R11 = | 4.763 | D11 = | 1.27 | N11 = | 1.74400 | ν11 = | 44.78 |
| R12 = | 10.422 | D12 = | 0.41 | N12 = | 1.84666 | ν12 = | 23.78 |
| R13 = | 3.924 | D13 = | Variable | | | | |
| * R14 = | 6.706 | D14 = | 2.0 | N14 = | 1.62299 | ν14 = | 58.16 |
| R15 = | 32.811 | D15 = | Variable | | | | |
| R16 = | ∞ | D16 = | 0.72 | N16 = | 1.51633 | ν16 = | 64.14 |
| R17 = | ∞ | | | | | | |

-continued f = 6.58~31.65 Fno = 2.88~4.84 2ω = 60.6°~13.8°

|  | Focal Length | | |
| --- | --- | --- | --- |
| Variable Distance | 6.58 | 15.00 | 31.65 |
| D3 | 0.72 | 9.01 | 16.24 |
| D7 | 17.14 | 6.31 | 2.38 |
| D13 | 8.77 | 10.00 | 19.13 |
| D15 | 3.15 | 6.40 | 5.29 |

Aspherical Coefficients

| 4th Surface | K = | −1.55114E+11 | | | | |
| --- | --- | --- | --- | --- | --- | --- |
| | A = | 1.06745E−02 | B = | −1.15013E−04 | C = | 2.08934E−06 |
| | D = | −4.57323E−08 | E = | 1.32157E−09 | F = | −1.17922E−11 |
| 5th Surface | K = | −3.00904E+00 | | | | |
| | A = | 2.17624E−03 | B = | 2.59865E−03 | C = | −7.76675E−05 |
| | D = | 3.26179E−06 | E = | −8.77024E−08 | F = | 1.27384E−09 |
| 9th Surface | K = | −8.36940E−01 | | | | |
| | A = | −1.75826E−04 | B = | −8.04904E−06 | C = | 1.20622E−06 |
| | D = | −1.63321E−07 | E = | 7.24849E−09 | F = | 0.00000E+00 |
| 14th Surface | K = | −7.59824E−01 | | | | |
| | A = | −2.38772E−02 | B = | −1.10606E−04 | C = | 2.94734E−06 |
| | D = | −1.59962E−07 | E = | 3.85088E−09 | F = | 0.00000E+00 |

Fourth Numerical Example f = 6.58~31.89 Fno = 2.88~4.90 2ω = 60.5°~13.7°

| R1 = | 21.336 | D1 = | 3.02 | N1 = | 1.51633 | ν1 = | 64.14 |
| --- | --- | --- | --- | --- | --- | --- | --- |
| R2 = | 303.173 | D2 = | Variable | | | | |
| * R3 = | −2090.826 | D3 = | 1.42 | N3 = | 1.88300 | ν3 = | 40.76 |
| * R4 = | 6.286 | D4 = | 2.01 | | | | |
| R5 = | 9.351 | D5 = | 2.0 | N5 = | 1.92286 | ν5 = | 18.90 |
| R6 = | 19.123 | D6 = | Variable | | | | |
| R7 = | Aperture | D7 = | −0.30 | | | | |
| * R8 = | 7.148 | D8 = | 2.50 | N8 = | 1.69350 | ν8 = | 53.21 |
| R9 = | −28.612 | D9 = | 0.27 | | | | |
| R10 = | 7.585 | D10 = | 1.86 | N10 = | 1.69680 | ν10 = | 55.53 |
| R11 = | −20.366 | D11 = | 0.62 | N11 = | 1.84666 | ν11 = | 23.93 |
| R12 = | 4.072 | D12 = | Variable | | | | |
| * R13 = | −4.980 | D13 = | 2.63 | N13 = | 1.80486 | ν13 = | 24.74 |
| R14 = | −19.934 | D14 = | 0.71 | N14 = | 1.69680 | ν14 = | 55.53 |
| R15 = | 73.422 | D15 = | Variable | | | | |
| R16 = | ∞ | D16 = | 0.72 | N16 = | 1.51633 | ν16 = | 64.14 |
| R17 = | ∞ | | | | | | |

|  | Focal Length | | |
| --- | --- | --- | --- |
| Variable Distance | 6.58 | 11.52 | 31.89 |
| D2 | 0.49 | 6.49 | 17.35 |
| D6 | 14.71 | 7.40 | 1.90 |
| D12 | 2.34 | 3.67 | 14.49 |
| D15 | 4.25 | 5.33 | 3.05 |

Aspherical Coefficients

| 3rd Surface | K = | −9.29016E+05 | | | | |
| --- | --- | --- | --- | --- | --- | --- |
| | A = | −3.93124E−03 | B = | 5.82504E−05 | C = | 2.06060E−06 |
| | D = | −6.70513E−09 | E = | −7.36062E−10 | F = | 7.67359E−12 |
| 4th Surface | K = | −1.81424E−01 | | | | |
| | A = | 2.48639E−03 | B = | −3.99043E−05 | C = | 5.95228E−06 |
| | D = | 1.06950E−08 | E = | 2.70297E−09 | F = | −1.67932E−10 |
| 8th Surface | K = | −1.48111E+00 | | | | |
| | A = | 2.76751E−03 | B = | 1.66592E−04 | C = | −9.77407E−06 |
| | D = | 1.13625E−06 | E = | −8.76335E−08 | F = | 4.99308E−09 |
| 13th Surface | K = | −9.83818E−01 | | | | |
| | A = | 1.44170E−01 | B = | 8.71054E−05 | C = | 1.74646E−06 |
| | D = | −8.69182E−08 | E = | 1.86508E−09 | F = | 0.00000E+00 |

TABLE 1

|  | 1st Example | 2nd Example | 3rd Example | 4th Example |
|---|---|---|---|---|
| Expression (1) | −1.06 | −1.19 | −0.92 | −1.04 |
| Expression (2) | 1.61 | 1.75 | 1.82 | 1.89 |
| Expression (3) | −1.81 | −2.00 | −1.90 | −1.66 |
| Expression (4) | −0.91 | −0.96 | −0.81 | −0.91 |
| Expression (5) | 1.91 | 1.91 | 1.84 | 1.45 |
| Expression (6) | 1.57 | 1.59 | 1.75 | 1.37 |
| Expression (7) | 1.89 | 1.89 | 1.89 | 1.89 |
| Expression (8) | 21.0 | 21.00 | 21.00 | 21.0 |

Next, a digital still camera including the zoom lens according to any one of the first to fourth embodiments as an image-forming optical system will be described below with reference to FIG. 9.

Referring to FIG. 9, the digital still camera includes a camera body 20; an image-forming optical system 21 including the zoom lens according to any one of the first to fourth embodiments; a solid-state image pickup device (photoelectric converter) 22, such as a CCD sensor and a CMOS sensor, that is mounted in the camera body 20 and that receives an object image formed by the image-forming optical system 21; a memory 23 that records information corresponding to the object image obtained as a result of photoelectric conversion performed by the solid-state image-pickup device 22; and a finder 24 including a liquid crystal display panel or other display and can be used to observe the object image formed on the solid-state image pickup device 22.

Thus, a small, high-optical-performance image pickup apparatus, such as a digital still camera, can be obtained by applying a zoom lens according to an embodiment of the present invention.

The zoom lens according to an embodiment of the present invention can also be used in single-lens reflex cameras, video cameras, etc.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-140256 filed May 28, 2007, which is hereby incorporated by reference herein in its entirety.

What is claimed is:

1. A zoom lens comprising:
a first lens unit having a positive refractive power;
a second lens unit having a negative refractive power;
a third lens unit having a positive refractive power; and
a fourth lens unit having a positive refractive power,
wherein the first lens unit, the second lens unit, the third lens unit, and the fourth lens unit are arranged in that order from an object side to an image side,
wherein the zoom lens performs zooming by changing distances between the lens units,
wherein the first lens unit includes two or less lenses and the second lens unit consists of a negative lens and a positive lens in that order from the object side to the image side, and
wherein the following condition is satisfied:

$-1.3 < m1/\sqrt{(fw \cdot fT)} < -0.8$ where fw and fT are focal lengths of the entire zoom lens at a wide-angle end and a telephoto end, respectively, and m1 is an amount of movement of the first lens unit in an optical axis direction during zooming from the wide-angle end to the telephoto end, the amount of movement m1 being positive when the first lens unit moves toward the image side and negative when the first lens unit moves toward the object side.

2. The zoom lens according to claim 1, wherein the following condition is satisfied:

$1.0 < f3/fw < 2.5$ where f3 is a focal length of the third lens unit.

3. The zoom lens according to claim 1, wherein the following condition is satisfied:

$-2.2 < m3/fw < -1.6$ where m3 is an amount of movement of the third lens unit in the optical axis direction during zooming from the wide-angle end to the telephoto end, the amount of movement m3 being positive when the third lens unit moves toward the image side and negative when the third lens unit moves toward the object side.

4. The zoom lens according to claim 1, wherein the following condition is satisfied:

$1.5 < f2/f3 < -0.8$ where f2 and f3 are focal lengths of the second lens unit and the third lens unit, respectively.

5. The zoom lens according to claim 1, wherein the following condition is satisfied:

$1.0 < (1-\beta 3T) \cdot \beta 4T < 3.0$ where $\beta 3T$ and $\beta 4T$ are lateral magnifications of the third lens unit and the fourth lens unit, respectively, at the telephoto end.

6. The zoom lens according to claim 1, wherein the following condition is satisfied:

$1.0 < (1-\beta 3T)/(1-\beta 3W) < 2.0$ where $\beta 3w$ and $\beta 3T$ are lateral magnifications of the third lens unit at the wide-angle end and the telephoto end, respectively.

7. The zoom lens according to claim 1, wherein the negative lens included in the second lens unit has an aspheric surface, and
wherein the following condition is satisfied:

$(N2P+N2N)/2 > 1.85$ where N2N and N2P are refractive indices of materials of the negative lens and the positive lens, respectively, which are included in the second lens unit.

8. The zoom lens according to claim 1, wherein the third lens unit includes at least one cemented lens including a positive lens and a negative lens, and
wherein the following condition is satisfied:

$18 < v3P - v3N < 24$ where v3P and v3N are Abbe numbers of materials of the positive lens and the negative lens, respectively, which form the cemented lens.

9. The zoom lens according to claim 1, wherein the fourth lens unit moves in a direction from the object side toward the image side to perform focusing from an object at infinity to a close object.

10. An image pickup apparatus, comprising:
the zoom lens according to claim 1; and
a solid-state image pickup device that receives an image formed by the zoom lens.

* * * * *